(12) United States Patent
Endo et al.

(10) Patent No.: US 12,464,209 B2
(45) Date of Patent: Nov. 4, 2025

(54) IMAGE CAPTURING APPARATUS CAPABLE OF EFFICIENTLY DISCHARGING HEAT FROM HEAT GENERATING DEVICES AND REDUCED IN SIZE

(71) Applicant: CANON KABUSHIKI KAISHA, Tokyo (JP)

(72) Inventors: Yosaku Endo, Kanagawa (JP); Yuta Nakamura, Kanagawa (JP); Yoji Oya, Kanagawa (JP); Kazuna Oyama, Kanagawa (JP); Yuko Iritani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 18/057,587

(22) Filed: Nov. 21, 2022

(65) Prior Publication Data
US 2023/0164408 A1    May 25, 2023

(30) Foreign Application Priority Data
Nov. 24, 2021    (JP) .................................. 2021-190114

(51) Int. Cl.
| | |
|---|---|
| *H04N 23/52* | (2023.01) |
| *G03B 17/55* | (2021.01) |
| *G03B 17/56* | (2021.01) |
| *H04N 23/53* | (2023.01) |

(Continued)

(52) U.S. Cl.
CPC ............. *H04N 23/52* (2023.01); *G03B 17/55* (2013.01); *G03B 17/563* (2013.01); *H04N 23/531* (2023.01); *H04N 23/54* (2023.01); *H05K 7/20145* (2013.01); *H05K 7/20154* (2013.01)

(58) Field of Classification Search
CPC ...... H04N 23/52; H04N 23/531; H04N 23/54; G03B 17/55; G03B 17/563; H05K 7/20145; H05K 7/20154
See application file for complete search history.

(56) References Cited

U.S. PATENT DOCUMENTS

| | | | |
|---|---|---|---|
| 2017/0261840 A1* | 9/2017 | Yoneda | .................. H04N 23/51 |
| 2021/0055512 A1* | 2/2021 | Yamamoto | ............. H04N 23/52 |
| 2021/0055631 A1* | 2/2021 | Mano | ................. H05K 7/20418 |

(Continued)

FOREIGN PATENT DOCUMENTS

| | | |
|---|---|---|
| JP | 2016-122718 A | 7/2016 |
| JP | 2019165304 A | 9/2019 |
| JP | 2021034788 A | 3/2021 |

*Primary Examiner* — Amy R Hsu
(74) *Attorney, Agent, or Firm* — Canon U.S.A., Inc. IP Division

(57) ABSTRACT

An image capturing apparatus that realizes both of efficient heat dissipation and size reduction of an image capturing apparatus body. The image capturing apparatus includes an imaging board having an image sensor mounted thereon, a main circuit board that has heat generating devices mounted thereon and is arranged substantially in parallel to an imaging surface of the image sensor on a rear side of the imaging board, a duct unit disposed on a rear side of the main circuit board, and a cooling fan that draws outside air into the duct unit. The duct unit has a duct base opposed to the main circuit board and disposed substantially in parallel to the main circuit board, and a duct plate disposed obliquely to the duct base at a predetermined angle. The cooling fan is mounted on the duct plate.

18 Claims, 28 Drawing Sheets

(51) Int. Cl.
*H04N 23/54* (2023.01)
*H05K 7/20* (2006.01)

(56) References Cited

U.S. PATENT DOCUMENTS

2021/0318594 A1* 10/2021 Schmit ................... G03B 17/55
2021/0373417 A1* 12/2021 Iritani ................... H04N 23/51

* cited by examiner

IMAGE CAPTURING APPARATUS CAPABLE OF EFFICIENTLY DISCHARGING HEAT FROM HEAT GENERATING DEVICES AND REDUCED IN SIZE

BACKGROUND

Technical Field

One disclosed aspect of the embodiments relates to an image capturing apparatus including circuit boards having heat generating devices mounted thereon, which is capable of efficiently discharging heat from the heat generating devices and is reduced in size.

Description of the Related Art

An image capturing apparatus contains heat generating devices, such as an image processing circuit and an image sensor, which generate heat when the image capturing apparatus is in operation. The heat generated by these heat generating devices may lower the performance of not only the heat generating devices themselves, but also other electrical devices, and may cause the temperature rise of the exterior of the image capturing apparatus, so that a user holding the image capturing apparatus may experience the exterior as hot to the touch. To prevent this, a mechanism is required for efficiently discharging heat generated in the image capturing apparatus to the outside of the image capturing apparatus.

As a method of discharging heat generated in the image capturing apparatus to the outside of the image capturing apparatus, a forced air-cooling method is used in which air is drawn from the outside of the image capturing apparatus by using a cooling fan, whereby heat generated in the image capturing apparatus is transferred to the drawn air to discharge the warmed air to the outside of the image capturing apparatus. For example, Japanese Laid-Open Patent Publication (Kokai) No. 2016-122718 has proposed an arrangement in which an L-shaped air-cooling duct is disposed to thereby discharge warmed air from an obliquely rearward location remote from a heat receiving portion of the air-cooling duct in an image capturing apparatus body.

One result of this arrangement of a portion of the cooling duct and cooling fans in the image capturing apparatus disclosed in Japanese Laid-Open Patent Publication (Kokai) No. 2016-122718 is a possible size increase of the image capturing apparatus body.

SUMMARY

One disclosed aspect of the embodiments provides an image capturing apparatus that realizes both the efficient dissipation of heat generated within an image capturing apparatus body to the outside of the image capturing apparatus and size reduction of the image capturing apparatus body.

In an aspect of the disclosure, there is provided an image capturing apparatus including an imaging board that has an image sensor mounted thereon, a main circuit board that has heat generating devices mounted thereon and is disposed substantially in parallel to an imaging surface of the image sensor, on a rear side of the imaging board, a duct unit that is disposed on a rear side of the main circuit board, and a cooling fan that draws outside air into the duct unit, wherein the duct unit comprises a duct base that is opposed to the main circuit board and is disposed substantially in parallel to the main circuit board, and a duct plate that is disposed obliquely to the duct base at a predetermined angle, wherein the cooling fan is mounted on the duct plate.

According to the disclosure, it is possible to realize both efficient dissipation of heat generated in the image capturing apparatus body to the outside of the image capturing apparatus and size reduction of the image capturing apparatus body.

Further features of the disclosure will become apparent from the following description of embodiments (with reference to the attached drawings).

DESCRIPTION OF THE EMBODIMENTS

The disclosure will now be described in detail below with reference to the accompanying drawings showing embodiments thereof.

Figure 1A:
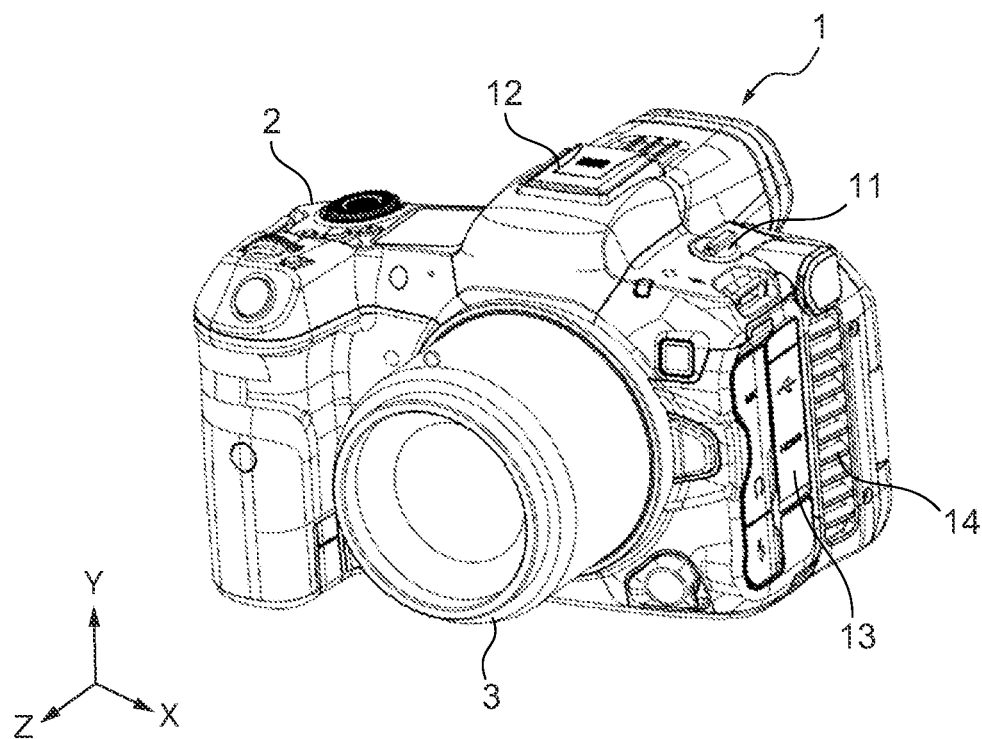
FIGS. 1A and 1B are appearance perspective views of an image capturing apparatus according to an embodiment.
Figure 1B:
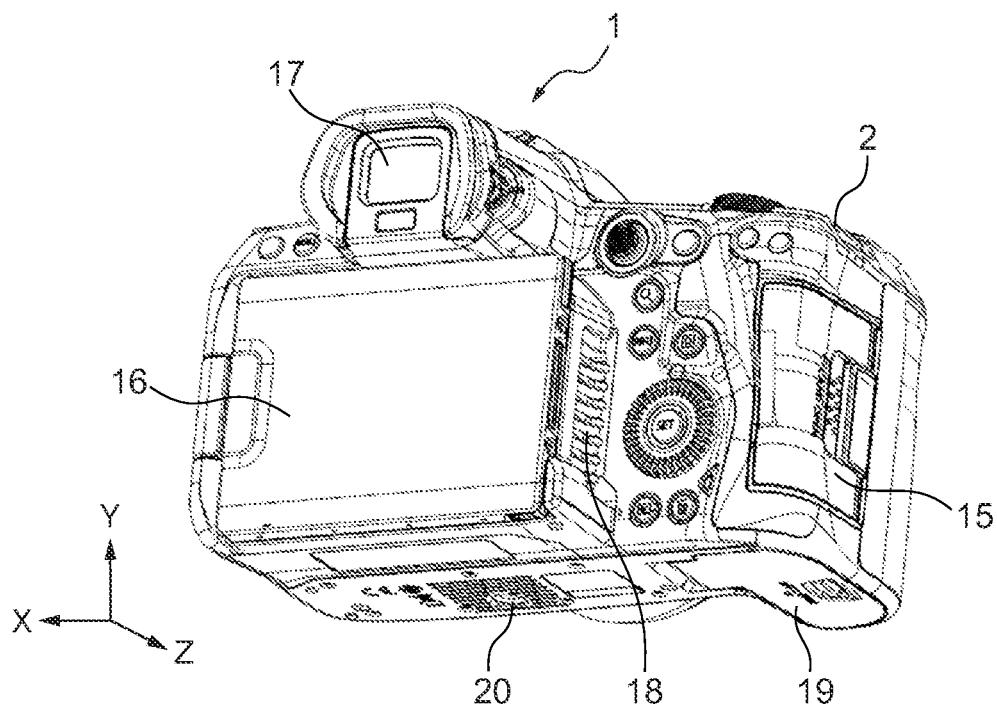

FIGS. 1A and 1B are appearance perspective views of an image capturing apparatus 1 according to an embodiment. A direction of viewing the image capturing apparatus 1 is different between FIGS. 1A and 1B. An orthogonal coordinate system formed by an X-axis, a Y-axis, and a Z-axis, which are perpendicular to one another, is defined as shown in FIGS. 1A and 1B, for convenience of explanation. The Z-axis is parallel to an imaging optical axis (axis, hereinafter referred to as the "optical axis", that passes the center of an image sensor 201 (see e.g. FIG. 4A), described hereinafter and is perpendicular to an imaging surface 1003 (see e.g. FIG. 8) of the image sensor 201) of the image capturing apparatus 1. A Z direction in which the Z-axis extends is defined such that a direction toward an object to be imaged is a positive direction (+Z direction) and a direction opposite to the +Z direction is a negative direction (−Z direction). When the Z-axis is in a horizontal plane, the X-axis is in the same horizontal plane, and an X direction in which the X-axis extends is defined as a width direction of the image capturing apparatus 1, a direction toward the right and a direction toward the left when the image capturing apparatus is viewed from an object side are defined as a positive direction (+X direction) and a negative direction (−X direction), respectively. In a state in which the X-axis and the Z-axis are in a horizontal plane, the Y-axis is parallel to a vertical direction, and a Y direction in which the Y-axis extends is defined as a height direction of the image capturing apparatus 1. Further, the Y direction is defined such that a direction toward the sky is a positive direction (+Y direction) and a direction toward the ground (gravity direction) is a negative direction (−Y direction).

The image capturing apparatus 1 is roughly formed by an image capturing apparatus body 2 and a lens barrel 3. Inside the image capturing apparatus body 2, there are arranged a power supply section, not shown, a main circuit board 101 (see e.g. FIG. 4A) that controls the overall operation of the image capturing apparatus 1, the image sensor 201 that generates image signals by converting an optical image formed by incident light from the lens barrel 3 to electrical signals, an image processing circuit, not shown, that converts the image signals to image data, and so forth. Further, the image capturing apparatus body 2 has a space provided therein, for accommodating a storage medium for storing the image data.

The lens barrel 3 is attached to a front side (+Z side) of the image capturing apparatus body 2. In the present embodiment, the lens barrel 3 is assumed to be a so-called interchangeable lens which can be attached and removed to and from the image capturing apparatus body 2. However, this is not limitative, but the lens barrel 3 may be integrally formed with (unremovable from) the image capturing apparatus body 2.

On a top surface (+Y side) of the image capturing apparatus body 2, there are provided a power switch 11 for switching on/off the power supply and an accessory shoe 12 for enabling attachment/removal of each of a variety of accessories. On a right-side (+X side) surface of the image capturing apparatus body 2, as viewed from the object side (+Z side), external terminal covers 13 for protecting connection terminals, not shown, such as a USB terminal and an HDMI (registered trademark) terminal, for connecting between the image capturing apparatus body 2 and external devices, not shown. Further, the right-side surface of the image capturing apparatus body 2 is provided with an air outlet port 14 for discharging air warmed by heat generated in the image capturing apparatus body 2 to the outside using a forced air-cooling mechanism, described hereinafter, using a cooling fan 102 (see e.g. FIG. 3).

On a left-side (−X side) surface of the image capturing apparatus body 2, as viewed from the object side, a medium cover 15 as a cover member for protecting a storage medium, not shown, accommodated in the image capturing apparatus body 2 is arranged. On a rear (−Z side) surface of the image capturing apparatus body 2, there are provided a display panel 16 and an electronic viewfinder 17. Further, the rear surface of the image capturing apparatus body 2 is provided with an air inlet port 18 for drawing outside air into the image capturing apparatus body 2 using the forced air-cooling mechanism, described hereinafter, using the cooling fan 102.

On a bottom (−Y side) surface of the image capturing apparatus body 2, there are provided a battery chamber cover 19 for protecting a battery chamber, not shown, for accommodating a battery, not shown, and a tripod screw 20 for attaching/removing a tripod, not shown.

Figure 2:
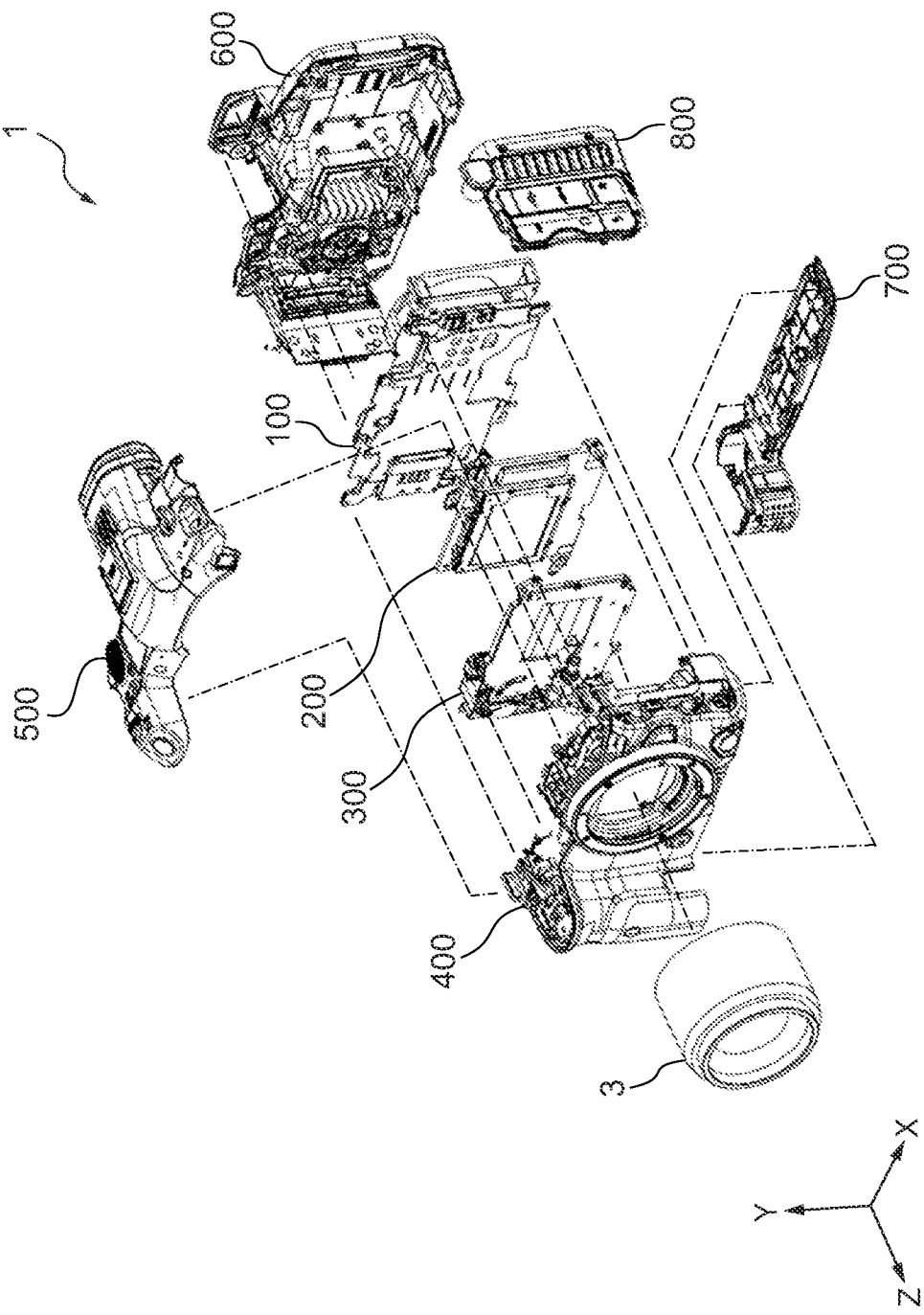
FIG. 2 is an exploded perspective view of the image capturing apparatus.

FIG. 2 is an exploded perspective view of the image capturing apparatus 1 in a state exploded into units as components of the image capturing apparatus body 2. The image capturing apparatus body 2 is roughly formed by a main unit 100, an imaging unit 200, a shutter unit 300, a front unit 400, a top unit 500, a rear unit 600, a bottom unit 700, and a side unit 800.

The main unit 100 has a duct unit 120 and the cooling fan 102, which form a closed space of the forced air-cooling mechanism, the main circuit board, and so forth. The imaging unit 200 has the image sensor 201 and an imaging board 202 (see e.g. FIG. 3) on which the image sensor 201 is mounted. The shutter unit 300 has a shutter mechanism for adjusting exposure time. The front unit 400 has a mount portion on which the lens barrel 3 is removably mounted. The top unit 500 has a viewfinder unit including the electronic viewfinder 17, and the power switch 11. The rear unit 600 has the display panel 16 and the air inlet port 18. The bottom unit 700 has a tripod portion including the tripod screw 20. The side unit 800 has the external terminal covers 13 and the air outlet port 14.

The image capturing apparatus body 2 is completed by assembling the shutter unit 300, the imaging unit 200, the main unit 100, the top unit 500, the rear unit 600, the bottom unit 700, and the side unit 800 to the front unit 400 in the mentioned order.

Figure 3:
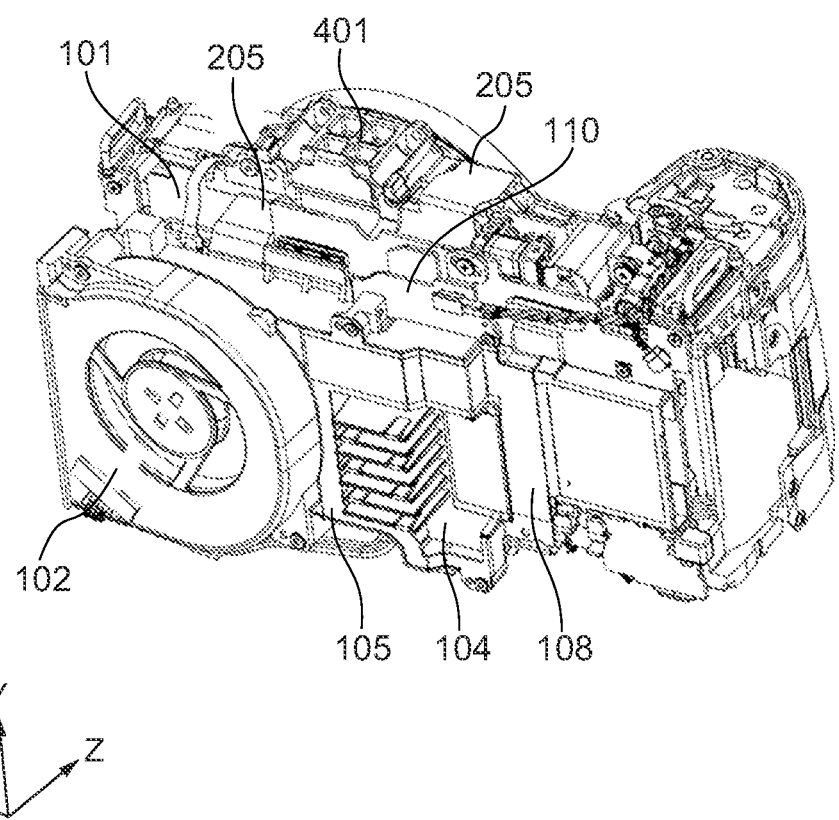
FIG. 3 is a perspective view of components forming the appearance of a heat dissipation system of the image capturing apparatus.
Figure 4A:
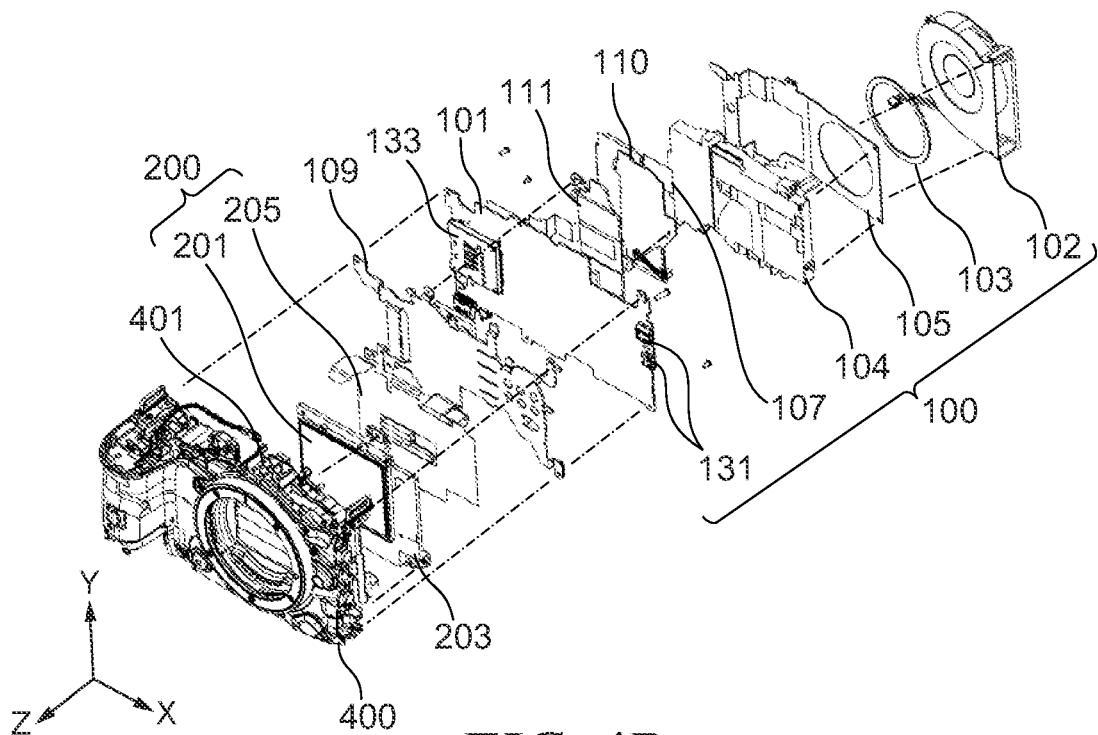
FIGS. 4A and 4B are exploded perspective views of the heat dissipation system of the image capturing apparatus.
Figure 4B:
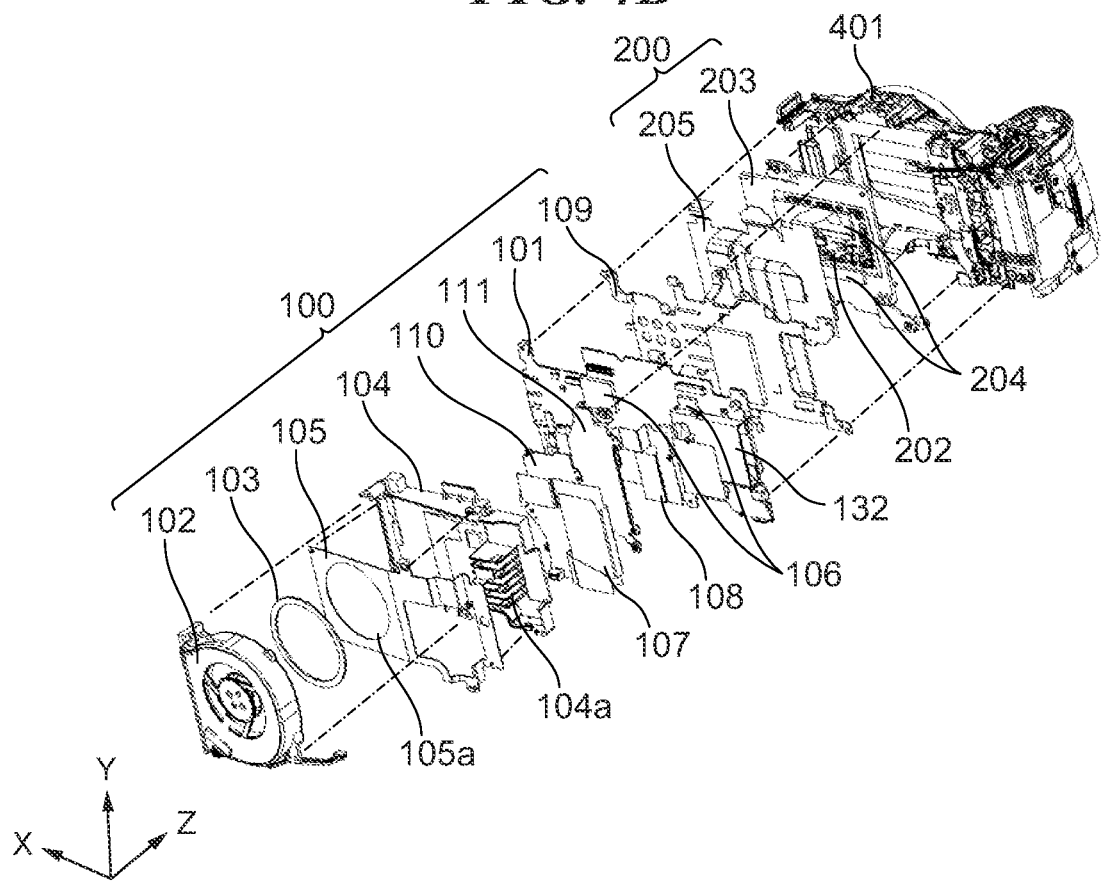

FIG. 3 is a perspective view of components of the appearance of a heat dissipation system of the image capturing apparatus 1. FIGS. 4A and 4B are exploded perspective views of the heat dissipation system of the image capturing apparatus 1, which are different in the direction of viewing the exploded heat dissipation system, as indicated by the coordinate axes illustrated therein.

The main unit 100, the imaging unit 200, and the front unit 400 each have a heat dissipation structure, and the whole heat dissipation system of the image capturing apparatus 1 is formed by the heat dissipation structures. The main unit 100 includes the main circuit board 101 and a power supply board 110 as heat generating sources. The heat dissipation structure of the main unit 100 has the cooling fan, denoted by reference numeral 102, a first cooling fan cushion 103, a duct base 104, a duct plate 105, and heat dissipation rubbers 106. Further, the heat dissipation structure of the main unit 100 has a first heat-conductive sheet 107, a second heat-conductive sheet 108, a heat dissipation plate 109, and a power supply board plate 111.

The imaging unit 200 has the image sensor 201 and the imaging board 202 as the heat generating sources. The heat dissipation structure of the imaging unit 200 has an imaging board holder 203, heat dissipation rubbers 204, a third heat-conductive sheet 205, and an imaging cooling member 206. The heat dissipation structure of the front unit 400 has an imaging unit-holding member 401.

Although details of each heat dissipation structure will be described hereinafter, here, the outline of the heat dissipation system of the image capturing apparatus 1 will be described. Heat generated in the main circuit board 101 and the imaging board 202 is transferred to the duct base 104 made of metal, such as aluminum, which is high in heat conductivity, via heat-conductive members, such as the heat dissipation rubbers 106, and the first, second, and third heat-conductive sheets 107, 108, and 205. A duct unit 120 having a closed space is formed by the duct base 104 and the duct plate 105, and outside air is taken into the duct unit 120 by the cooling fan 102. Thus, air flowing through the duct unit 120 is warmed by heat exchange with the duct base 104, and the warmed air is discharged to the outside, whereby heat dissipation from the inside of the image capturing apparatus body 2 to the outside is performed. Note that an air inlet portion 121 (see FIG. 5B) of the duct unit 120 is connected to the air inlet port 18 (see FIG. 1B), and an air outlet portion 122 (see FIG. 5B) of the duct unit 120 is connected to the air outlet port 14 (see FIG. 1A).

The main circuit board 101 is arranged on the heat dissipation plate 109 in a state held thereon such that the main circuit board 101 is perpendicular to the optical axis, not shown, of the image capturing apparatus 1. As shown in FIG. 4A, on a +X side of the main circuit board 101, an external connection terminal group 131 is mounted, and a second medium socket 133 is mounted on a +Z side surface of the main circuit board 101. As shown in FIG. 4B, on a −X side of the main circuit board 101, a first medium socket 132 is mounted on a −Z side surface of the main circuit board 101. Note that in FIG. 1A, the external connection terminal group 131 is covered by the external terminal covers 13, and in FIG. 1B, the first medium socket 132 and the second medium socket 133 are covered by the medium cover 15, and hence these components do not appear in the external appearance.

The power supply board 110 that controls the power supply of the image capturing apparatus 1 is disposed at a location rearward (in a −Z direction) of the main circuit board 101 substantially in parallel to the main circuit board 101 such that the main circuit board 101 and the main circuit board 101 substantially overlap when viewed in the optical axis direction (as viewed from the +Z side toward the −Z side along the optical axis). The power supply board 110 is held on the power supply board plate 111 and is fixed to the heat dissipation plate 109 via the power supply board plate 111.

The duct base 104 is disposed at a location rearward (on a −Z side) of the main circuit board 101 substantially in parallel to the main circuit board 101 such that the duct base 104 and the main circuit board 101 substantially overlap when viewed in the optical axis direction. The duct plate 105 is fixed to the duct base 104, and the duct unit 120 having a closed space is formed by the duct plate 105 and the duct base 104.

The cooling fan 102 is disposed on a rear side (−Z side) of the duct base 104 in a state sandwiching the first cooling fan cushion 103 between the cooling fan 102 and the duct plate 105. By driving the cooling fan 102, air flows into the closed internal space of the duct unit 120. The cooling fan 102 is a so-called centrifugal fan and discharges air sucked from a planar direction to a centrifugal direction (side surface).

On the main circuit board 101, there are mounted heat generating devices that consume large power and generate a large amount of heat, such as an MPU, a video engine (image processing circuit), and a volatile memory. Heat generated in the main circuit board 101 is transferred to the duct base 104 via the first heat-conductive sheet 107. Heat generated in a first recording medium which can be attached to the first medium socket 132 of the main circuit board 101 is transferred to the duct unit 120 via the second heat-conductive sheet 108. Heat generated in the image sensor 201 is transferred to the duct base 104 via the third heat-conductive sheet 205. Details of these heat transfer paths will be described hereinafter.

When driving the cooling fan 102, air (outside air) flows into the duct unit 120, whereby heat exchange occurs between the duct base 104 whose temperature is rising and air flowing in the duct unit 120, and the warmed air is discharged to the outside. Thus, the heat generated in the image capturing apparatus body 2 is dissipated to outside air, whereby it is possible to cool the image capturing apparatus body 2, in other words, it is possible to suppress rise of the internal temperature.

Figure 5A:
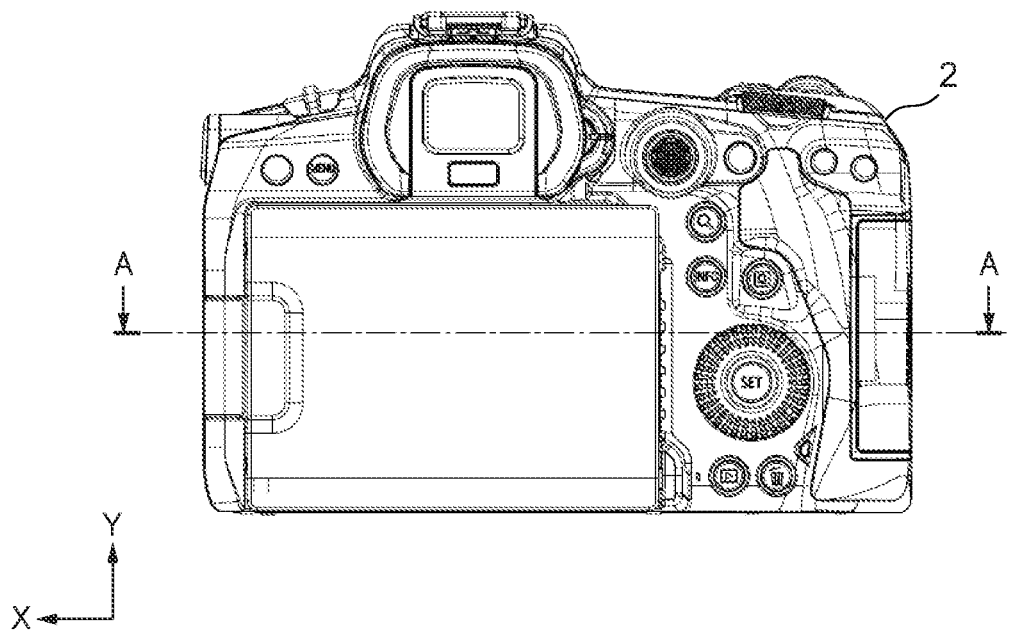
FIG. 5A is a rear view of an image capturing apparatus body.
Figure 5B:
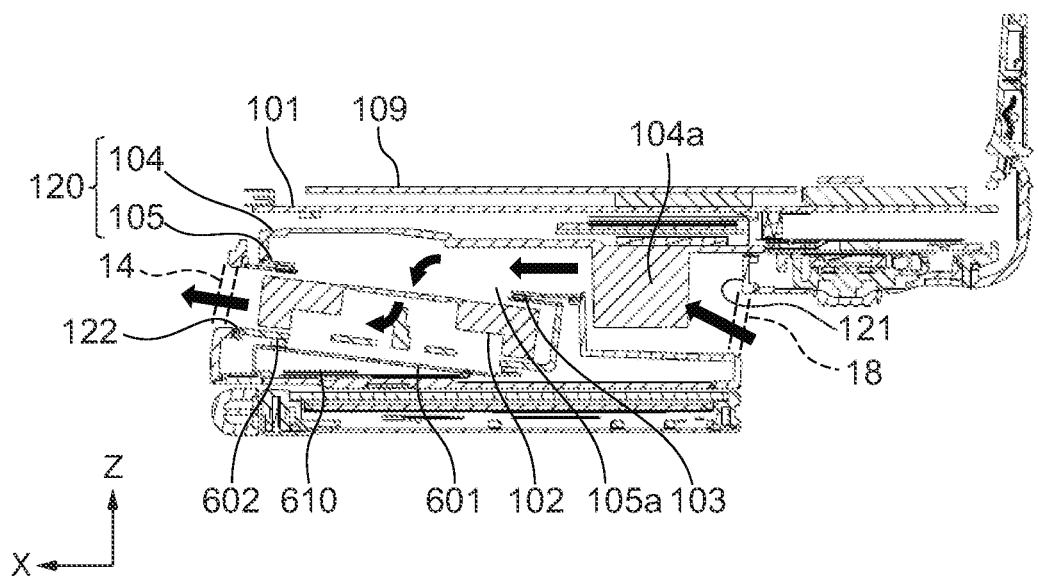
FIG. 5B is a schematic cross-sectional view of the heat dissipation system of the image capturing apparatus, taken along A-A in FIG. 5A.

Next, the heat dissipation structure of the main unit 100 will be described. FIG. 5A is a rear view of the image capturing apparatus 1, and FIG. 5B is a schematic cross-sectional view of the heat dissipation system of the image capturing apparatus, taken along A-A in FIG. 5A, in which a flow of air in the heat dissipation system is illustrated. To clearly illustrate the heat dissipation structure of the main unit 100, FIG. 5B shows only the main unit 100, the rear unit 600, and the side unit 800.

By driving the cooling fan 102, air sucked from the air inlet port 18 into the image capturing apparatus body 2 flows in a direction indicated by an arrow in FIG. 5B and then flows into the internal space of the duct unit 120 formed by the duct base 104 and the duct plate 105. The air flowing into the internal space of the duct unit 120 passes between a plurality of duct fins 104a formed on the duct base 104, then passes through the inside of the cooling fan 102, and is discharged in the centrifugal direction of the cooling fan 102 and discharged from the air outlet port 14.

The cooling fan 102 has two surfaces opening in opposite planar directions. One of the opening surfaces of the cooling fan 102 is in contact with the duct plate 105 with the first cooling fan cushion 103 disposed therebetween and is opposed to an opening 105a of the duct plate 105. The other of the opening surfaces of the cooling fan 102 is in contact with a rear plate 601 with a second cooling fan cushion 602 disposed therebetween. The rear plate 601 is not formed with an opening, and hence when the rear unit 600 is assembled to the main unit 100, the other opening of the cooling fan 102 is closed. Therefore, as mentioned above, by driving the cooling fan 102, air flows into the duct unit 120 only from the air inlet port 18.

Figure 6:
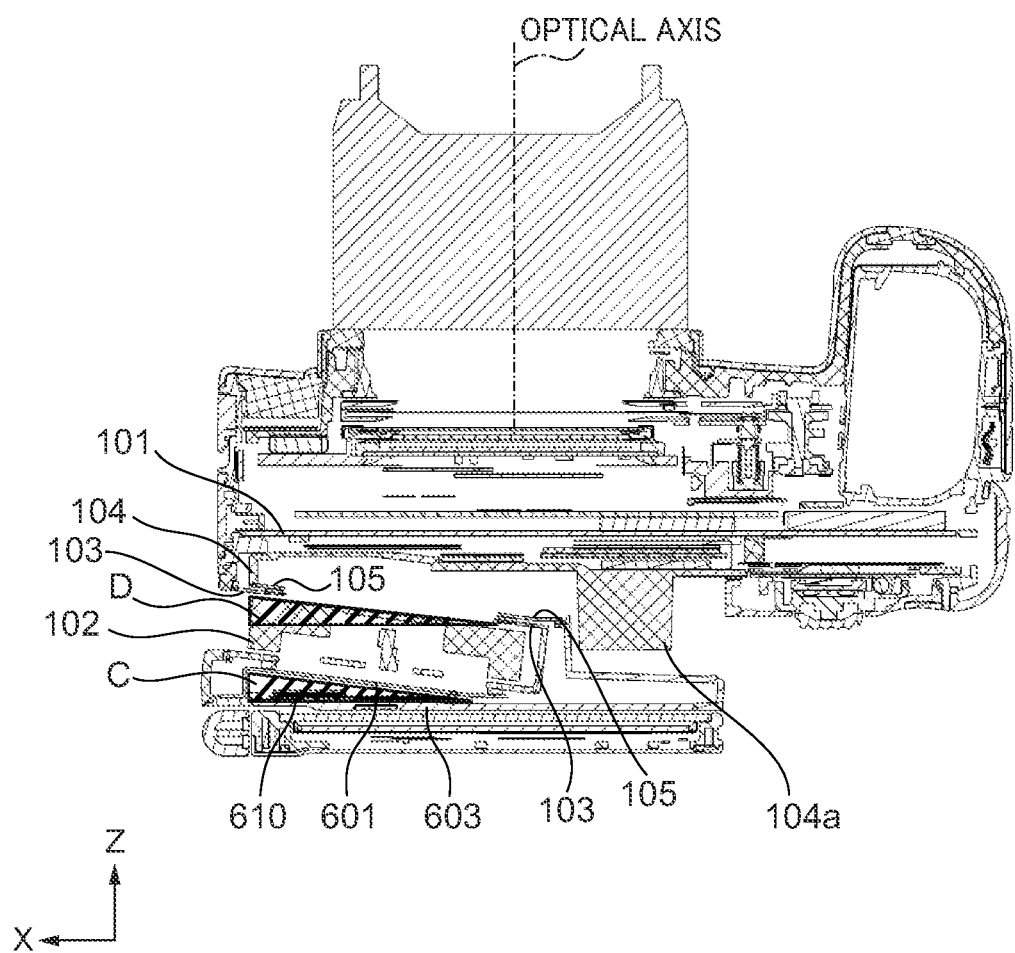
FIG. 6 is a cross-sectional view showing the internal layout of the image capturing apparatus.

FIG. 6 is a cross-sectional view showing the internal layout of the image capturing apparatus 1 and corresponds to the cross-sectional view taken along A-A in FIG. 5A. Here, the description is given mainly of the structures of the cooling fan 102 and the duct base 104 of the main unit 100.

The main circuit board 101 is arranged to be substantially perpendicular to the optical axis of the image capturing apparatus 1. In other words, the main circuit board 101 is arranged such that the thickness direction of the main circuit board 101 is substantially parallel to the optical axis. The duct base 104 which provides a wall on the front side ((+Z side) toward the main circuit board 101) of the duct unit 120 is arranged to be perpendicular to the optical axis, in other words, substantially opposed to the main circuit board 101 in the optical axis direction. The duct plate 105 which provides a wall on the rear side (−Z side) of the duct unit 120 is arranged to be inclined at a predetermined angle with respect to the optical axis (such that an angle formed with the optical axis is larger than 0° and smaller than 90°) as shown in FIG. 6. In other words, the duct plate 105 is arranged to be inclined at a predetermined angle also with respect to the duct base 104 (such that an angle formed with the duct base 104 is larger than 0° and smaller than 90°).

The cooling fan 102 is attached to the rear surface (surface on the −Z side) of the duct plate 105, and therefore, the cooling fan 102 is attached obliquely to the optical axis. For this reason, in a Z-X plane, a space portion C having a substantially triangular cross-sectional shape is formed between the cooling fan 102 and a rear cover 603 disposed substantially in parallel to the main circuit board 101, at a location rearward (on the −Z side) of the cooling fan 102. In other words, the cooling fan 102 is obliquely disposed such that a space portion D having a substantially triangular cross-sectional shape encroaches on the duct unit 120 having a substantially rectangular cross-sectional shape. As is clear from comparison of FIG. 6 with FIG. 5B, the space portion D is an area in the duct unit 120, where air does not flow, and hence the heat dissipation efficiency (cooling efficiency) is not reduced. That is, by arranging the cooling fan 102 obliquely to the duct base 104, the space of the space portion C is generated without degrading the heat dissipation performance (cooling performance).

Figure 7A:
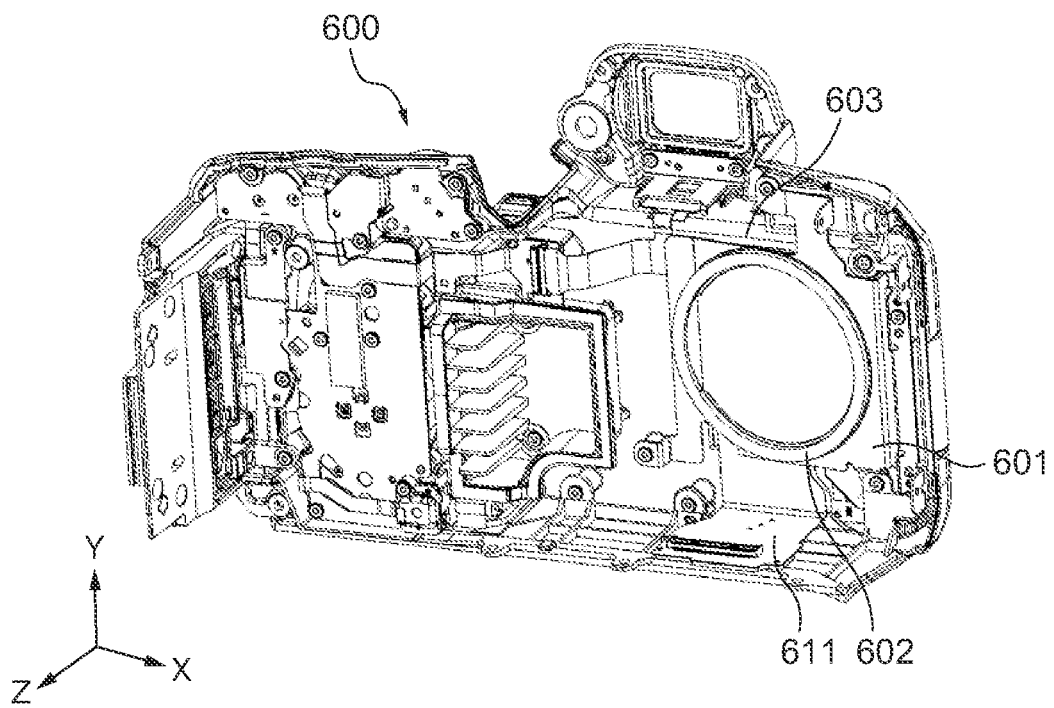
FIGS. 7A and 7B are perspective views of a rear unit as a component of the image capturing apparatus.
Figure 7B:
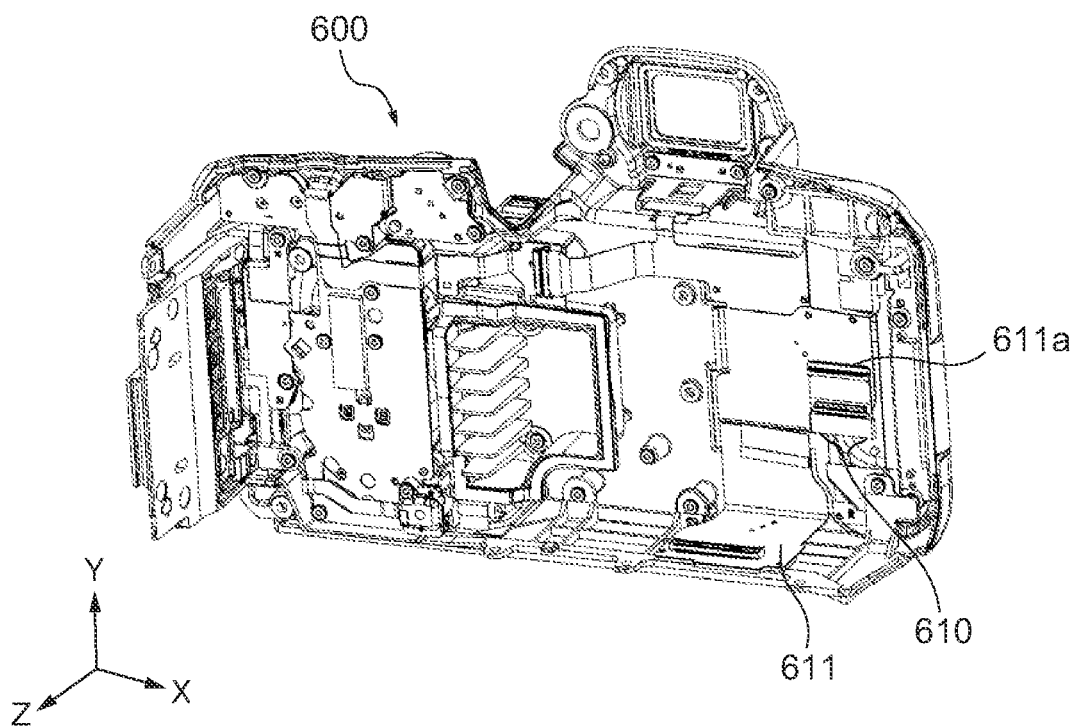

Next, the heat dissipation structure of the rear unit 600 will be described. FIGS. 7A and 7B are perspective views of the rear unit 600. FIG. 7A shows a state in which the rear plate 601 has been attached, and FIG. 7B shows a state in which the rear plate 601 has been removed.

The rear unit 600 has the display panel 16 (see FIG. 1B). A panel connection wire 610 connected to the display panel 16 is connected to a connector 611a of a rear connection flexible board 611, and the rear connection flexible board 611 is connected to the main circuit board 101 via a relay flexible board, not shown. With this, image signals generated by the main circuit board 101 are transmitted to the display panel 16, whereby an image of the image signals is displayed on the display panel 16.

The rear plate 601 has a surface substantially parallel to the rear cover 603 and a surface substantially parallel to the cooling fan 102, which are formed continuous with each other, and the second cooling fan cushion 602 is attached to one of these two surfaces, which is substantially parallel to the cooling fan 102. The panel connection wire 610 is received in a space formed by the rear cover 603 substantially perpendicular to the optical axis and the surface, substantially parallel to the cooling fan 102, of the rear plate 601.

Here, size reduction of the image capturing apparatus body 2, realized by the layout of the main unit 100 and the rear unit 600, will be described with reference to FIG. 6. As described above, the cooling fan 102 is mounted on the duct plate 105 arranged obliquely to the optical axis in the duct unit 120. Therefore, the space portion C having the substantially triangular cross-sectional shape is formed between the cooling fan 102 and the rear cover 603 when viewed in the Y-axis direction (as viewed from the top of the image capturing apparatus 1). Accordingly, by making effective use of the space portion C through accommodation of the panel connection wire 610 of the rear unit 600 in the space portion C, it is possible to realize size reduction of the image capturing apparatus body 2 (reduction of the thickness in the Z direction).

Next, a positional relationship between the cooling fan 102 and the duct fins 104a will be described. As shown in FIGS. 4B and 5B, the plurality of duct fins 104a are arranged inside the duct unit 120 such that the duct fans 104a extend along a direction in which air flows. The duct fins 104a are arranged in a position where the duct fins 104a and the main heat sources of the main circuit board 101 overlap when viewed in the optical axis direction. Therefore, heat is transferred from the main heat sources near the duct fins 104a to the duct fins 104a via the first heat-conductive sheet 107, and therefore, the duct fins 104a efficiently function as a heat sink.

Further, as shown in FIG. 5B, the cooling fan 102 and the duct fins 104a are arranged at respective locations where they do not overlap each other when viewed in the optical axis direction but partially overlap along the Z direction when viewed in the X-axis direction (as viewed in the width direction of the image capturing apparatus 1). This makes it possible to realize size reduction of the image capturing apparatus body 2 (reduction of the thickness in the Z direction).

Further, the duct fins 104a and the cooling fan 102 are designed such that the cross-sectional area of the duct fins 104a in the air flow direction and the cross-sectional area of the cooling fan 102 in the air flow direction are substantially the same. Thus, it is possible to arrange the duct fins 104a having a surface area required to function as the heat sink and ensure the air flow rate necessary for heat dissipation, whereby it is possible to realize the high heat dissipation performance.

Figure 8:
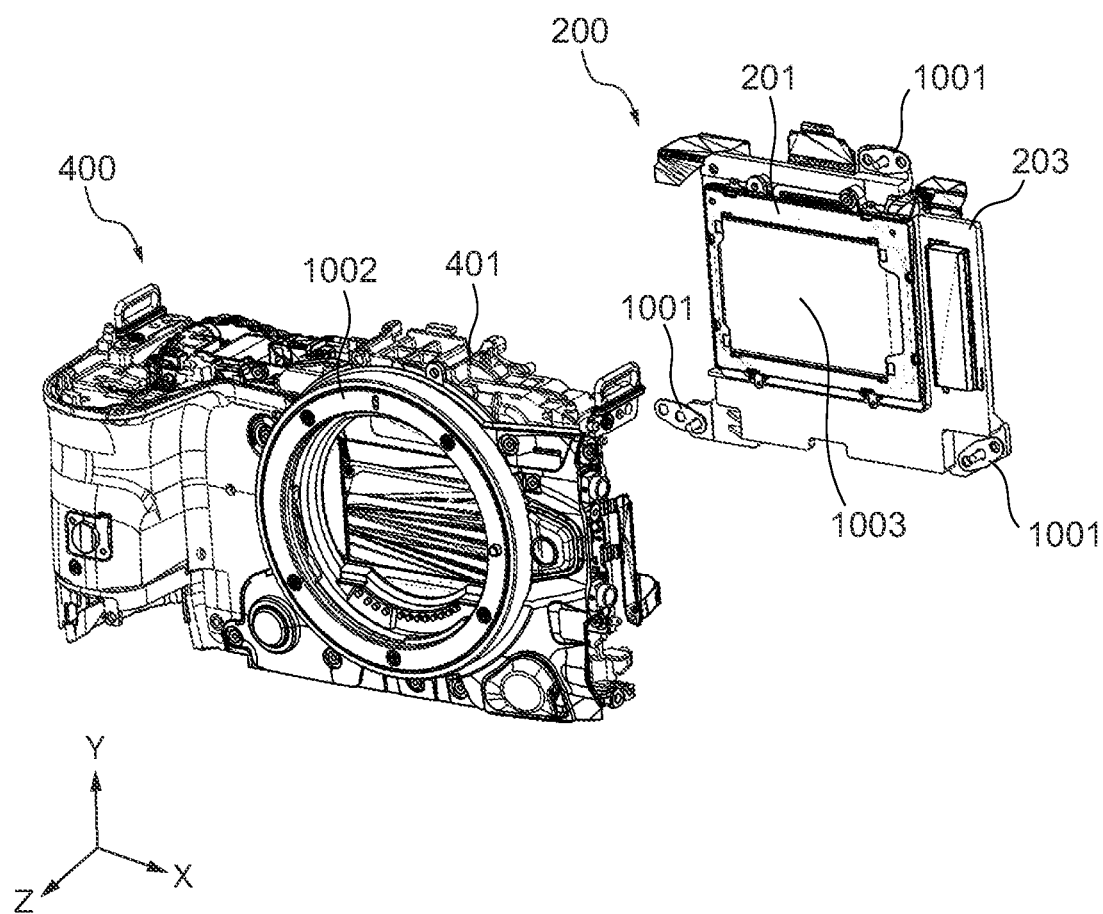
FIG. 8 is perspective view of an imaging unit and a front unit of the image capturing apparatus in a disassembled state.
Figure 9:
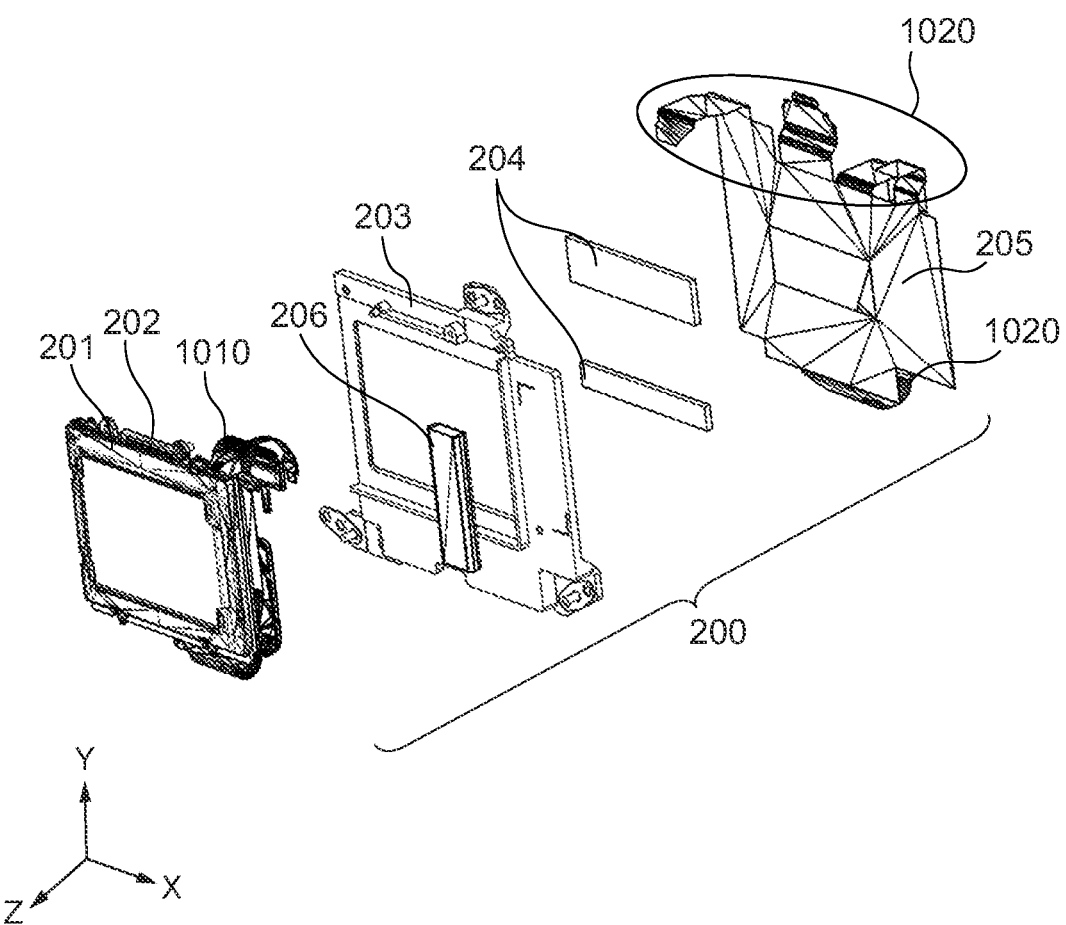
FIG. 9 is an exploded perspective view of the imaging unit.
Figure 10:
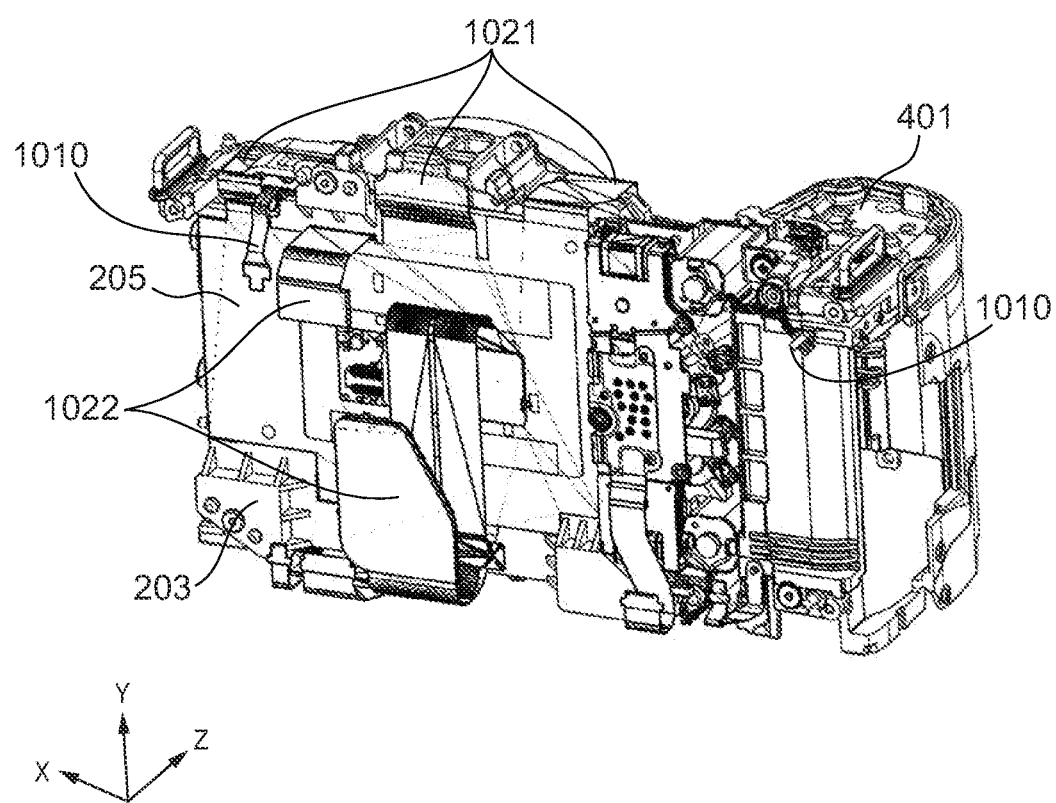
FIG. 10 is a perspective view of the imaging unit and the front unit in an assembled state.
Figure 11:
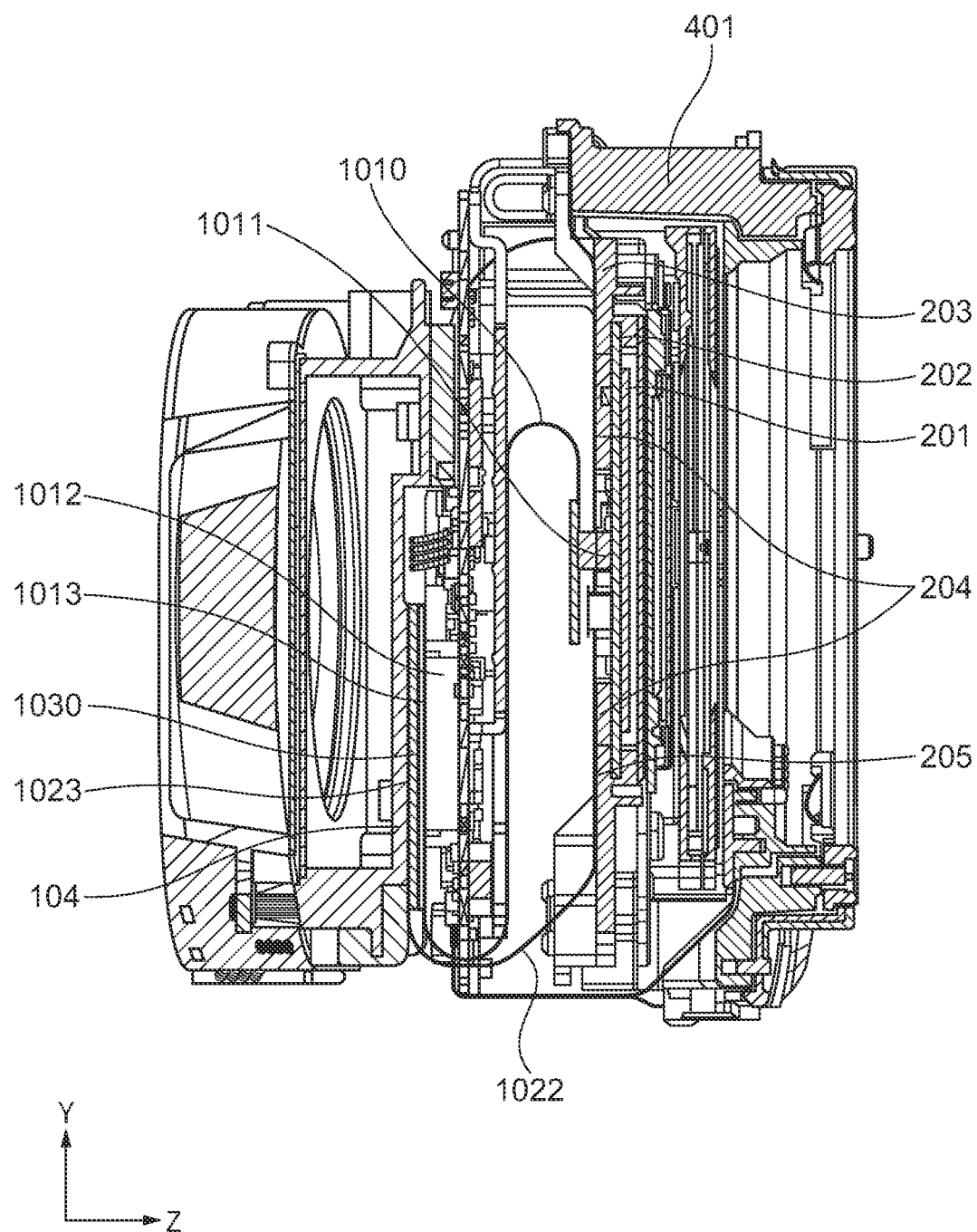
FIG. 11 is a cross-sectional view of a main unit, the imaging unit, and the front unit.

Next, the heat dissipation structure of the imaging unit 200 will be described. FIG. 8 is perspective view of the imaging unit 200 and the front unit 400 in a disassembled state. FIG. 9 is an exploded perspective view of the imaging unit 200. FIG. 10 is a perspective view of the imaging unit 200 and the front unit 400 in an assembled state, mainly showing the structures of the top surface and the rear surface. FIG. 11 is a Y-Z cross-sectional view (cross-sectional view taken along a plane perpendicular to the X-axis) of the main unit 100, the imaging unit 200, and the front unit 400, showing a cross-section at a position including the optical axis of the image capturing apparatus 1.

In the present embodiment, the image sensor 201 and the imaging board 202 are integrally formed by arranging the imaging board 202 on the rear side of the image sensor 201 in the optical axis direction and are electrically connected with each other. Incident light through the lens barrel 3 forms an image on an imaging surface 1003 of the image sensor 201.

The imaging unit 200 and the front unit 400 are fixed between the imaging board holder 203 and the imaging unit-holding member 401 via washers 1001. By changing the thickness of the washer 1001 or layering the plurality of washers 1001, it is possible to adjust a distance from a lens mount surface 1002 to the imaging surface 1003 of the image sensor 201 (so-called flange back) in the optical axis direction. It is desirable that the imaging board holder 203 and the imaging unit-holding member 401 are fixed at three or more locations so as to make it possible to adjust the tilt of the imaging surface 1003 in the optical axis direction with respect to the lens mount surface 1002.

The imaging board 202 and the imaging board holder 203 are bonded (fixed) with an adhesive. Image capturing section electrical connection members 1010 electrically connect between the imaging board 202 and the main circuit board 101. The image capturing section electrical connection members 1010 are, specifically, flexible boards, and are provided at two respective locations in the X-axis direction as shown in FIG. 10. On a rear surface of a structure body formed by the image sensor 201, the imaging board 202, and the imaging board holder 203, the heat dissipation rubbers 204 and the third heat-conductive sheet 205 are affixed. The third heat-conductive sheet 205 is e.g. a sheet material, such as a graphite sheet, which has high heat conductivity.

The third heat-conductive sheet 205 is affixed to the respective rear surfaces of the imaging board holder 203 and the heat dissipation rubbers 204 in a state extending thereacross. The third heat-conductive sheet 205 has a plurality of heat conductive portions 1020. Front-side heat conductive portions 1021 of the plurality of heat conductive portions 1020 are connected to the imaging unit-holding member 401 formed of metal, such as aluminum, having a high heat conductivity. Therefore, heat generated in the image sensor 201 and the imaging board 202 is transferred to the imaging unit-holding member 401 having a high heat capacity via the front-side heat conductive portions 1021 of the third heat-conductive sheet 205, and is diffused, whereby the temperature rise of the imaging unit 200 is suppressed.

Rear-side heat conductive portions 1022 of the plurality of heat conductive portions 1020 of the third heat-conductive sheet 205 are routed along the image capturing section electrical connection member 1010 and are thermally connected to the duct base 104. Note that the two rear-side heat conductive portions 1022 are provided at upper and lower locations (on a +Y side and a −Y side), respectively.

An image sensor cushion member 1030 which is an elastic member is disposed between a reinforcing plate 1013 on which a main circuit board connector 1012 is mounted and the rear-side heat conductive portions 1022. The image sensor cushion member 1030 is charged (compressed) when assembling the duct unit 120 to the main unit 100, whereby the image sensor cushion member 1030 urges duct contact surfaces 1023 of the rear-side heat conductive portions 1022 toward the duct base 104. This makes it possible to positively bring the duct contact surfaces 1023 into contact with the duct base 104 without generating variation in the contact state when the associated components are assembled, and perform heat dissipation with high efficiency.

One end of the image capturing section electrical connection member 1010 is connected to an imaging board connector 1011. The other end of the image capturing section electrical connection member 1010 is routed from the imaging board connector 1011 toward the rear side of the main circuit board 101 in a state bent into an S-shape or U-shape and is connected to the main circuit board connector 1012 mounted on the reinforcing plate 1013. As described above, since the image sensor cushion member 1030 is charged, it is possible to prevent the image capturing section electrical connection member 1010 from coming off the main circuit board connector 1012.

The heat dissipation rubbers 204 are affixed to the rear surface of the imaging board 202 and sandwiched and held between the imaging board 202 and the third heat-conductive sheet 205. Although in the present embodiment, the heat dissipation rubbers 204 are affixed at the two locations spaced in the Y direction, the number and the locations of the heat dissipation rubbers 204 are not limited to these, but for example, the heat dissipation rubbers 204 may be affixed at two respective locations spaced in the X direction.

The imaging cooling member 206 is affixed to the front surface of the imaging board holder 203. The imaging cooling member 206 is arranged at a location where the imaging cooling member 206 is brought into contact with the imaging unit-holding member 401 when the imaging unit 200 is assembled to the front unit 400 and is sandwiched and held between the imaging board holder 203 and the imaging unit-holding member 401. The imaging cooling member 206 is e.g. a member formed by winding a graphite sheet around a cushion member, a heat dissipation rubber having a high flexibility, or the like.

In the imaging unit 200 constructed as described above, heat generated in the image sensor 201 and the imaging board 202 is transferred to the third heat-conductive sheet 205 via the imaging board holder 203 and the heat dissipation rubbers 204. Part of the heat transferred to the third heat-conductive sheet 205 is transferred to the imaging unit-holding member 401 via the front-side heat conductive portions 1021 and is diffused. Further, part of the heat transferred to the third heat-conductive sheet 205 is transferred to the duct base 104 via the rear-side heat conductive portions 1022 and is dissipated to the outside of the image capturing apparatus body 2 by the forced air-cooling mechanism using the cooling fan 102. By forming the heat dissipation paths described above, it is possible to efficiently dissipate heat generated in the imaging unit 200 to the outside.

Figure 12:
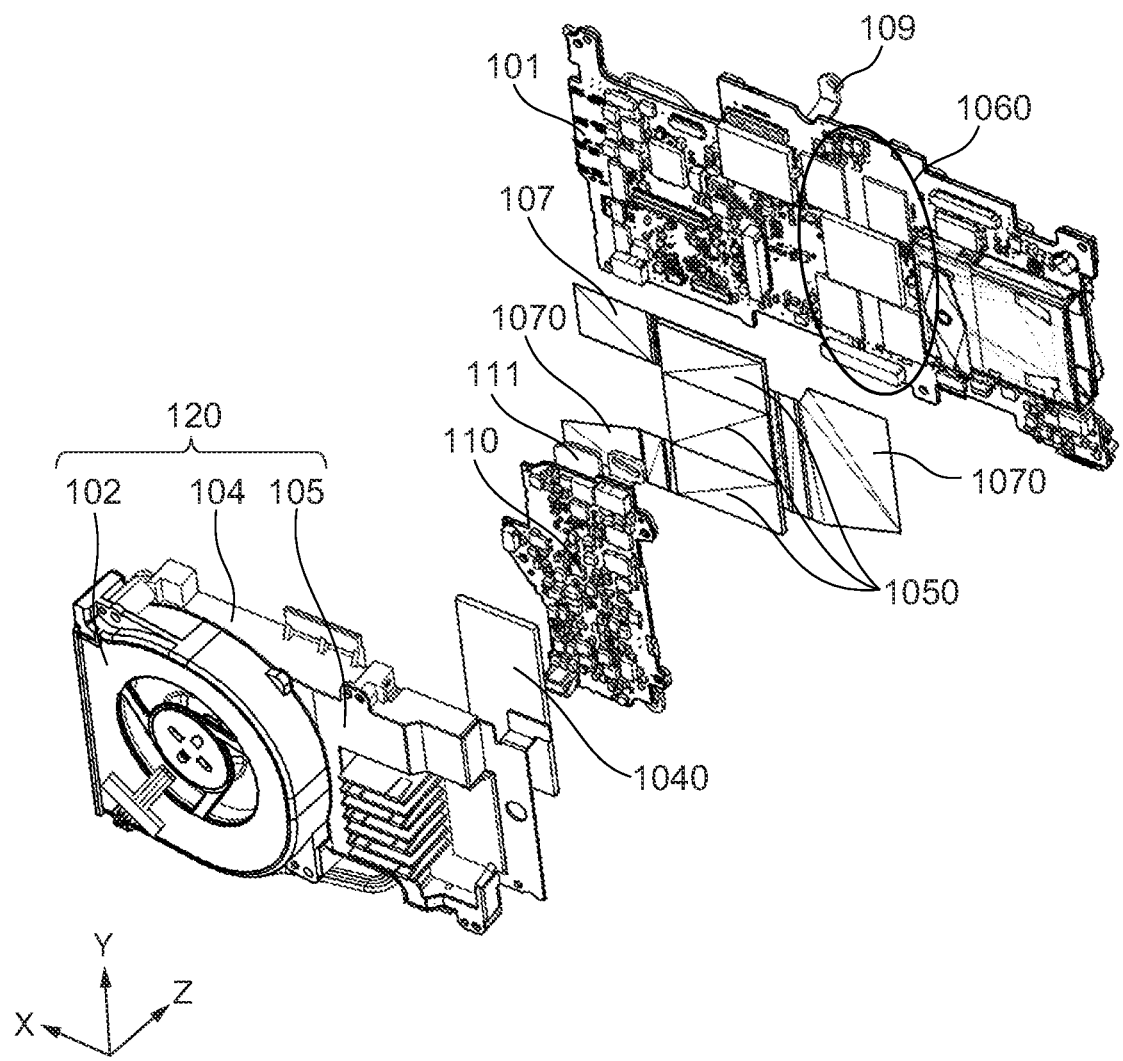
FIG. 12 is an exploded perspective view of the main unit.
Figure 13A:
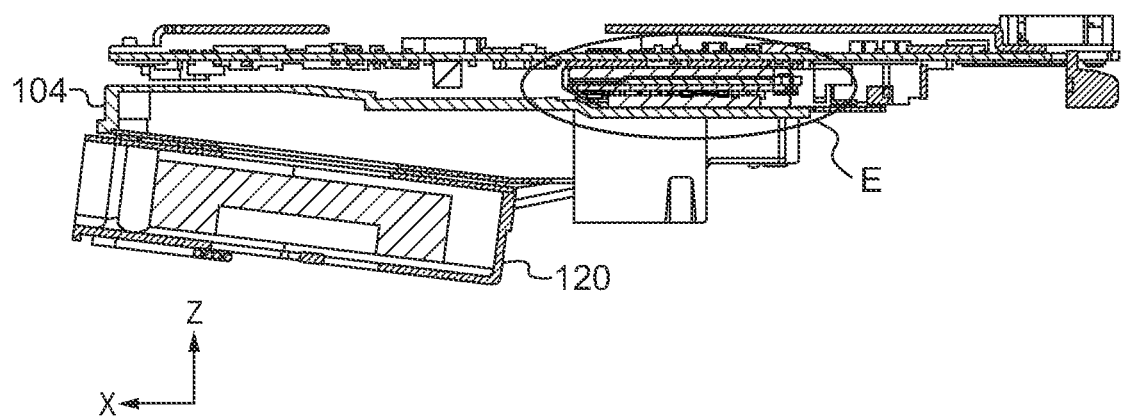
FIGS. 13A and 13B are a Z-X cross-sectional view (including an optical axis) and a partially enlarged view of the main unit, respectively.
Figure 13B:
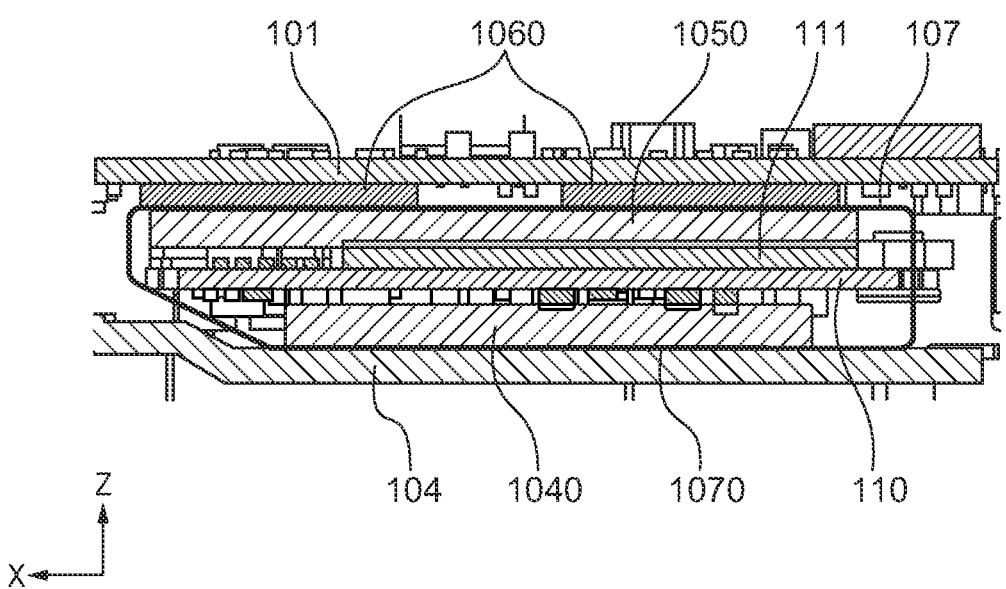
Figure 14:
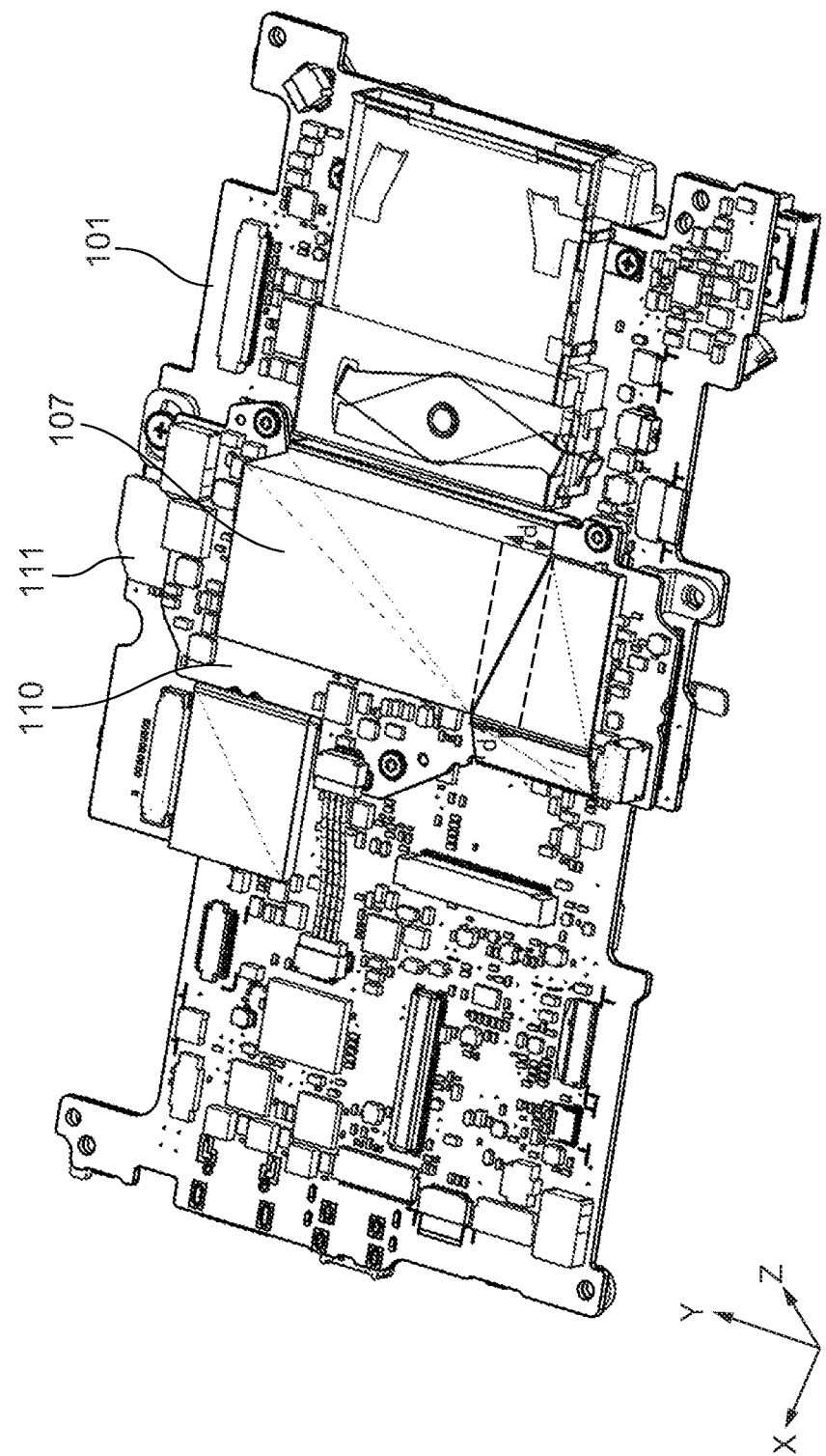
FIG. 14 is a perspective view of a main circuit board, a power supply board, and a first heat-conductive sheet in an assembled state.

Next, the heat dissipation structure of the main circuit board 101 will be described. FIG. 12 is an exploded perspective view of the main unit 100. FIG. 13A is a Z-X cross-sectional view (cross-sectional view perpendicular to the Y-axis) of the main unit 100, which show a cross-section of the main unit 100 including the optical axis (not shown). FIG. 13B is an enlarged view of an area E in FIG. 13A. FIG. 14 is a perspective view of the main circuit board 101, the power supply board 110, and the first heat-conductive sheet 107 in an assembled state.

On the main circuit board 101, there are mounted main heat source elements 1060 that consume large power consumption, such as a video engine and a volatile memory. Note that FIG. 12 shows the plurality of main heat source elements 1060 in a state surrounded by an ellipse. The power supply board 110 and the duct unit 120 are arranged substantially in parallel with the image circuit board 101 and the power supply board 110 and the duct unit 120 overlap the main heat source elements 1060 when viewed in the optical axis direction. In the image capturing apparatus 1, since the power supply board 110 is arranged between the duct base 104 and the main heat source elements 1060 in the optical axis direction, it is required to configure such that heat generated in the main circuit board 101 is transferred to the duct base 104 by avoiding the power supply board 110. On the other hand, the power supply board 110 also has electronic components and electrical components mounted thereon, for controlling power supply for enabling the functions of the image capturing apparatus 1, and hence the power consumption is large, which requires heat dissipation.

For this reason, heat transfer from the main heat source elements 1060 on the main circuit board 101 and the power supply substrate 110 to the duct base 104 is performed using the first heat-conductive sheet 107, a main heat source element cushion member 1050, and a heat dissipation rubber 1040, and the heat is dissipated from the duct base 104. Details of this heat dissipation structure will be described below.

The main heat source element cushion member 1050 is affixed to the front side (+Z side) of the power supply board plate 111 that holds the power supply board 110, and the first heat-conductive sheet 107 is affixed to the front side of the main heat source element cushion member 1050. When the power supply board 110 is assembled to the main circuit board 101 in this state, the main heat source element cushion member 1050 is charged, and the first heat-conductive sheet 107 is brought into contact with the main heat source elements 160 on the main circuit board 101. The heat dissipation rubber 1040 is affixed to the rear side (−Z side) of the power supply board 110. Further, duct-side contact surfaces 1070 of the first heat-conductive sheet 107 are affixed to the rear side (−Z side) of the heat dissipation rubber 1040. Here, it is desirable to use a member having proper elasticity for the heat dissipation rubber 1040. With this, the heat dissipation rubber 1040 is charged when the duct unit 120 is assembled to the main unit 100, whereby it is possible to positively bring the duct-side contact surfaces 1070 of the first heat-conductive sheet 107 into contact with the duct base 104.

Note that the main heat source element cushion member 1050 has a heat insulation property. Therefore, it is possible to transfer heat generated in the main circuit board 101 to the duct base 104 via the first heat-conductive sheet 107 while suppressing transfer of heat generated in the main heat source elements 1060 to the power supply board 110 (power supply board plate 111). On the other hand, the heat dissipation rubber 1040 is a member having a heat conductivity. Therefore, it is possible to transfer heat generated in the power supply board 110 to the duct base 104 via the heat dissipation rubber 1040 and the duct-side contact surfaces 1070 of the first heat-conductive sheet 107. The heat thus transferred to the duct base 104 is dissipated to the outside of the image capturing apparatus body 2 by the forced air-cooling mechanism using the cooling fan 102.

Note that in the present embodiment, the duct-side contact surfaces 1070 are routed from the outside of two opposite sides (more specifically, right and left sides (±X sides)) of the power supply board 110 to the rear side (−Z side) of the heat dissipation rubber 1040. However, this is not limitative, but the duct-side contact surface 1070 may be routed from the outside of only one side of the power supply board 110 or from the outside of upper and lower sides (±Y sides) which are the other two opposite sides.

However, to enhance the heat dissipation performance, it is desirable to route the duct-side contact surfaces 1070 from both sides of the power supply board 110 in the X direction as in the present embodiment (or in the Y direction). In this case, portions, the duct-side contact surfaces 1070 which each have a width d, as indicated in FIG. 14, and are drawn out from the ±X sides, are affixed to the heat dissipation rubber 1040 such that they do not overlap in the optical axis direction (Z direction). In the present example, although each duct-side contact surface 1070 is formed into a shape that is reduced in width from its root part affixed to the heat dissipation rubber 1040 toward its tip end, this is not limitative. This makes it possible to avoid generation of unevenness in contact between the duct-side contact surfaces 1070 and the duct base 104 and increase the amount of heat to be transferred from the main heat source elements 1060 to the duct base 104 via the first heat-conductive sheet 107 up to an approximately upper limit of the present configuration to thereby improve the heat dissipation performance.

Next, the heat dissipation structure for dissipating heat from a recording medium accommodated in the image capturing apparatus 1 will be described. In the image capturing apparatus 1, a variety of data can be recorded and reproduced by using a card-shaped recording medium. There has been a demand for increasing the recording capacity and transfer speed of a recording medium, so that the power consumption of the recording medium is increased in accordance with an increase in the transfer speed, causing an increase in the amount of heat generation. Therefore, it is necessary to cool (dissipate heat from) the recording medium with a view to preventing degradation of the performance due to temperature rise.

Figure 15:
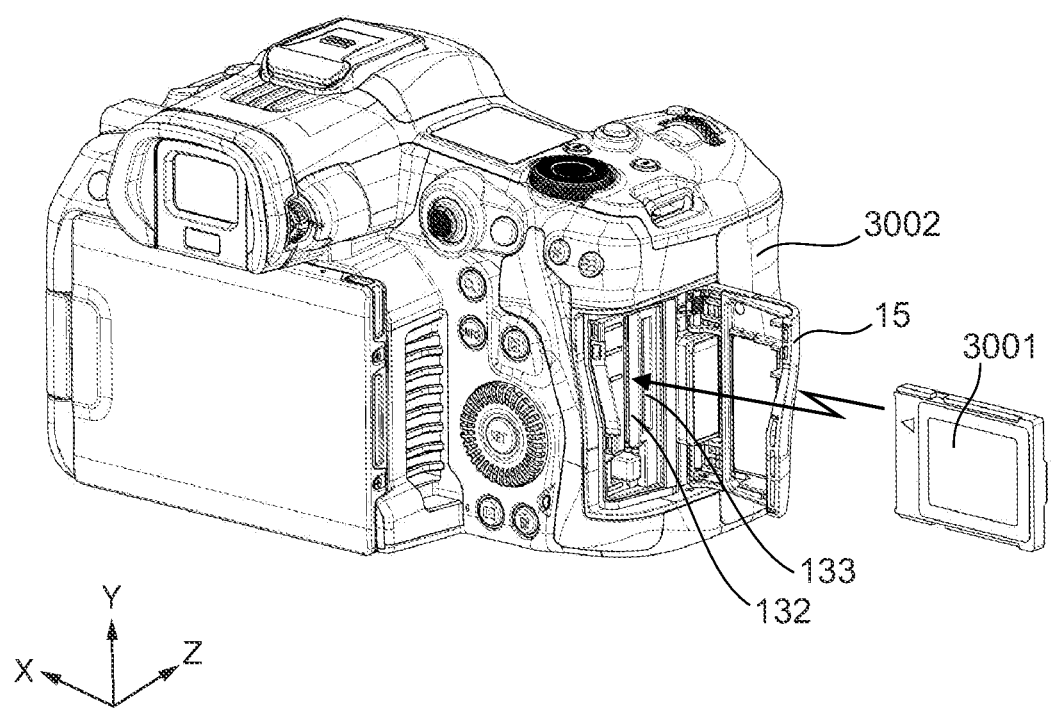
FIG. 15 is a schematic view useful in explaining an operation of inserting/removing a recording medium into/from the image capturing apparatus.

FIG. 15 is a schematic view useful in explaining an operation of inserting/removing a recording medium 3001 into/from the image capturing apparatus 1. In a general image capturing apparatus, it is assumed that a user holds (grips) the image capturing apparatus body by a right hand, and a holding part (grip) is provided on the −X side. Further, in view of the layout of the image sensor and the like, a recording medium-accommodating section into which a recording medium is inserted is often arranged in the holding part. Similar to this, in the image capturing apparatus 1, a holding part 3002 is provided on the −X side of the image capturing apparatus body 2, and the first medium socket 132 and the second medium socket 133, which are the recording medium-accommodating section, are provided in the holding part 3002. The medium cover 15 which can be opened/closed is provided on the recording medium-accommodating section, and the recording medium 3001 is inserted/removed in a state in which the medium cover 15 is opened.

Figure 16:
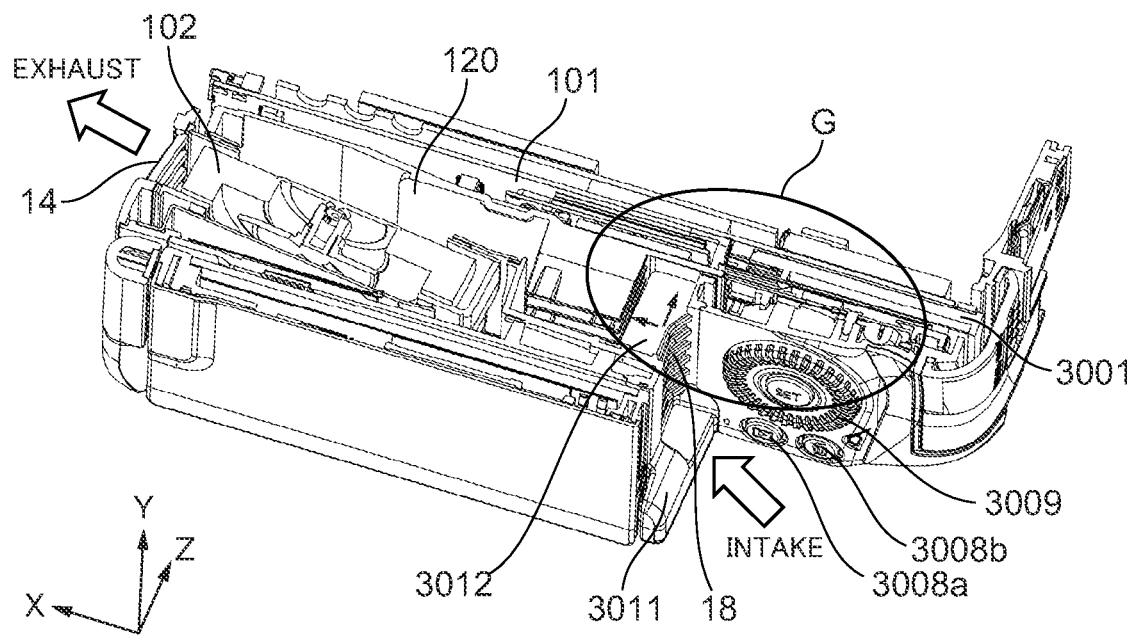
FIG. 16 is a perspective view showing a cross-section of the image capturing apparatus body.

FIG. 16 is a perspective view the image capturing apparatus body 2 shown in a cross-section taken along A-A in FIG. 5A, in which part rearward (on the −Z side) of the main circuit board 101 is mainly shown. The first medium socket 132 is disposed in a state displaced in the X direction with respect to the duct unit 120 and is mounted on the main circuit board 101. This is because the holding part 3002 in which the recording medium-accommodating section is provided has restriction in thickness in the Z direction so as to maintain the ease of holding the holding part 3002, and therefore, it is difficult to arrange the first medium socket 132 such that part of the duct unit 120 and the first medium socket 132 overlap each other when viewed in the optical axis direction.

In the present embodiment, the first medium socket 132 and the duct unit 120 are thermally connected by the second heat-conductive sheet 108 to allow heat generated in the recording medium 3001 to be released to the duct unit 120 via the first medium socket 132 and the second heat-conductive sheet 108.

Figure 17:
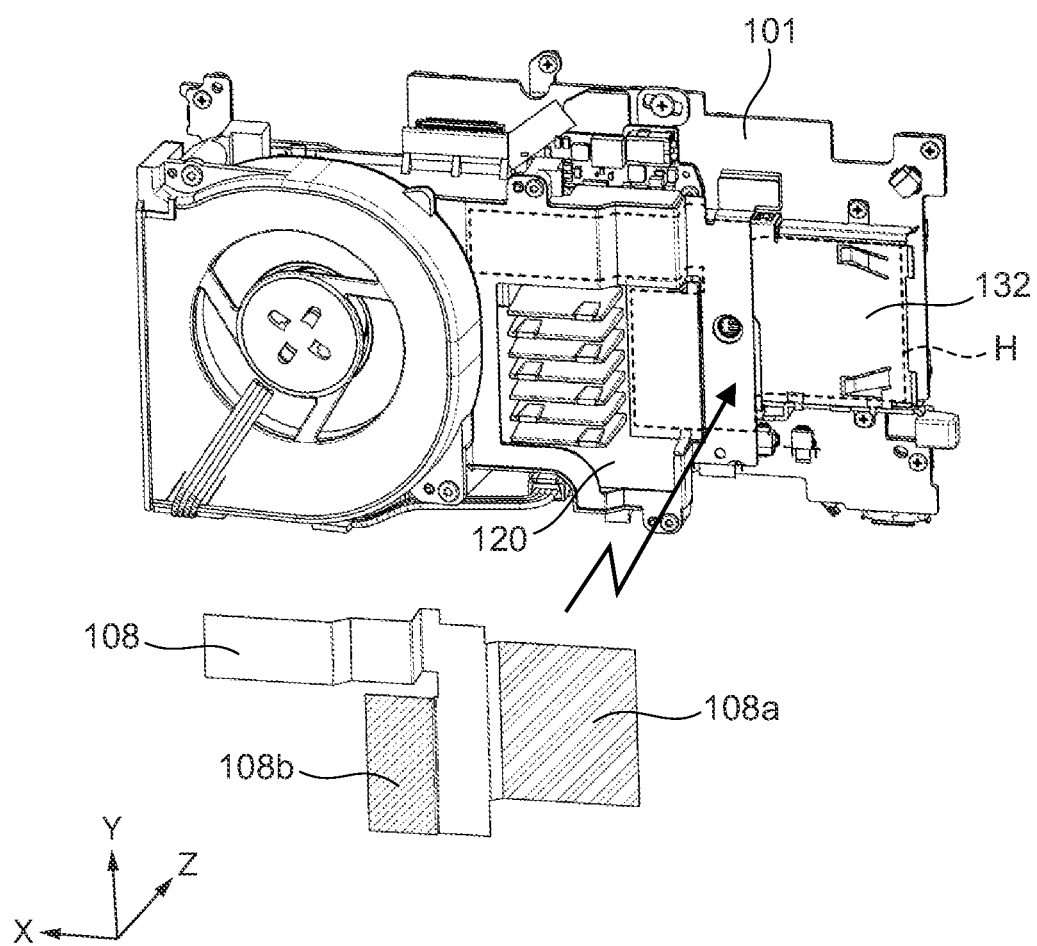
FIG. 17 is a perspective view useful in explaining a shape and an attaching position of a second heat-conductive sheet.

FIG. 17 is a perspective view useful in explaining a shape and an attaching position of the second heat-conductive sheet 108. The second heat-conductive sheet 108 has a first connection portion 108a that connects to a surface of the first medium socket 132 and a second connection portion 108*b* that connects to an inner surface of the duct unit 120, and is disposed in a state affixed to part H indicated by broken lines in FIG. 17. By connecting the second connection portion 108*b* to the inner surface of the duct unit 120, the second connection portion 108*b* is brought into direct contact with air flowing in the duct unit 120. With this, it is possible to efficiently discharge heat transferred from the recording medium 3001 to the second heat-conductive sheet 108, to the outside.

Figure 18:
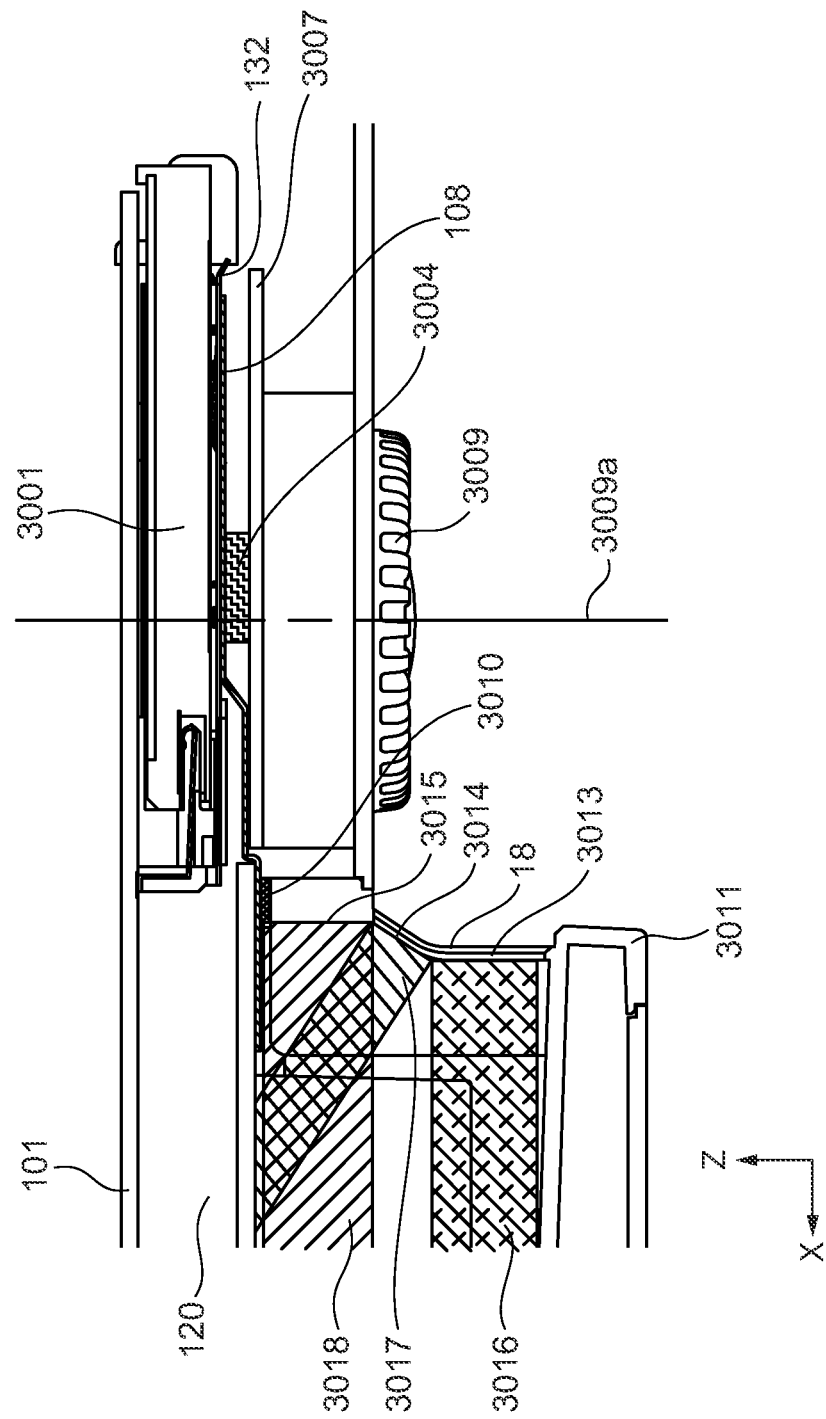
FIG. 18 is an enlarged top view of a G portion in FIG. 16.

FIG. 18 is an enlarged top view of a G portion in FIG. 16. (as viewed from the +Y side). The second heat-conductive sheet 108 is thermally connected to a rear heat dissipation plate 3007 via a heat dissipation member 3004 having elasticity provided in an intermediate portion of a path from the first connection portion 108*a* to the second connection portion 108*b*. The rear heat dissipation plate 3007 is a plate member made of metal (metal plate) that supports operation members, such as operation buttons 3008*a* and 3008*b*, and an operation dial 3009, which are arranged on a rear surface of the holding part 3002. With this, heat generated in the recording medium 3001 is also transferred to the rear heat dissipation plate 3007 via the second heat-conductive sheet 108 and the heat dissipation member 3004 and is dissipated from the rear heat dissipation plate 3007 to the outside.

Further, the second heat-conductive sheet 108 is inserted from an opening formed in the duct unit 120 into the duct unit 120 (into the air flow passage), on the intermediate portion of the path from the first connection portion 108*a* to the second connection portion 108*b*. In this opening (place where the second heat-conductive sheet 108 is inserted into the duct unit 120), a cushion member 3010 as an elastic member is disposed between the second heat-conductive sheet 108 and the duct unit 120. The cushion member 3010 covers the opening in a compressed state and presses part of the second heat-conductive sheet 108 toward the duct base 104 of the duct unit 120. This makes it possible to positively perform heat dissipation while keeping the sealability of the air flow passage in the duct unit 120.

Note that although in the above description, the description is given of the form of applying the heat dissipation structure for dissipating heat from the recording medium to one medium socket (the first medium socket 132), the same heat dissipation structure may be applied to the second medium socket 133. Further, the heat dissipation structure may be provided in both of the first medium socket 132 and the second medium socket 133. The second heat-conductive sheet 108 may be connected not directly to the first medium socket 132, but to a surface of the main circuit board 101 on which the first medium socket 132 is mounted, which surface is opposite from the surface on which the first medium socket 132 is mounted. Further, the board on which the medium socket is mounted is not limited to the main circuit board 101 but may be a dedicated board (medium board).

As shown in FIG. 5B, in the image capturing apparatus 1, outside air is drawn from the air inlet port 18 by driving the cooling fan 102, and after being caused to pass through the internal duct unit 120, the air is discharged from the air outlet port 14. At this time, to cause the duct unit 120 to exhibit the heat dissipation performance, it is necessary to ensure a sufficient amount of air passing through the duct unit 120, and to do this, the air inlet port 18 and the air outlet port 14 are both required to each have a necessary and sufficient opening amount (opening area).

However, if the respective opening amounts of the air inlet port 18 and the air outlet port 14 are simply increased on one exterior surface, this makes it difficult to achieve size reduction of the image capturing apparatus 1, which is the aim of the disclosure, and further, the appearance (beauty) may be impaired. To prevent this, the opening of the air inlet port 18 is formed in two surfaces in a state extending thereacross. With this, compared with a case where the same opening amount is secured on one surface, it is possible to secure the equivalent opening amount and further, reduce the opening amount visually recognized by a user when the user faces the opening surface to thereby increase the beauty of design.

More specifically, as shown in FIG. 18, the air inlet port 18 is provided in a first surface 3013 and a second surface 3014, which are not parallel to each other. An intake air duct cover 3011 forming a flow passage of air drawn from the air inlet port 18 has a first space 3016 extending in a direction perpendicular to the first surface 3013 and a second space 3017 extending in a direction perpendicular to the second surface 3014. The first space 3016 and the second space 3017 are formed such that they do not overlap each other when viewed in the Y-axis direction as shown in FIG. 18. With this, it is possible to make a structure which does not narrow the width of the air flow passage with respect to the opening amount while ensuring the opening amount of the air inlet port 18.

Further, the intake air duct cover 3011 is formed such that it has a third space 3018 which is perpendicular to a third surface 3015 extending from the second surface 3014 and includes an area which does not overlap the second space 3017. With this, the air flow passage formed by the intake air duct cover 3011 becomes a shape which narrows toward the inside of the image capturing apparatus 1, and the second heat-conductive sheet 108 is connected to the duct unit 120 in the third space 3018.

On the other hand, since the air flow passage narrows toward the inside, the range of the inside of the duct unit 120, which can be visually recognized from the opening surface of the air inlet port 18, becomes wide. The appearance treatment, such as coating, is not performed on the inner wall surface of the duct unit 120, and hence if a wide range of the inside of the duct unit 120 can be visually recognized, the appearance quality of the image capturing apparatus 1 may be degraded.

To solve this problem, in the present embodiment, as indicated by arrows in FIG. 16, an air inlet port louver 3012 of the intake air duct cover 3011 is extended in a direction perpendicular to the opening surface of the air inlet port 18 to make it difficult to visually recognize the inside of the duct unit 120 from the opening surface. The direction of extending the air inlet port louver 3012 is parallel to the first space 3016, the second space 3017, and the third space 3018. Therefore, even when the air inlet port louver 3012 is extended, this does not interfere with the flow of air flowing into the duct unit 120, and therefore, the heat dissipation performance is not lowered. Note that the above-described configuration of the opening of the air inlet port 18 formed in the two surfaces and configuration of the air inlet port louver 3012 can also be applied to the air outlet port 14.

As for a relationship between the operation dial 3009, arranged on the rear surface of the image capturing apparatus body 2 and the air inlet port 18, if the operation dial 3009 is disposed in the vicinity of the opening surface of the air inlet port 18, a finger operating the operation dial 3009 may cover the air inlet port 18. To avoid this problem, the operation dial 3009 protrudes toward the −Z side more than the exterior surface, and a rotational axis 3009*a* of the operation dial 3009 is positioned to be substantially parallel to the first surface 3013 and closer to the second surface 3014 than the first surface 3013. This makes it difficult for a finger operating the operation dial 3009 to cover the air inlet port 18.

Figure 19A:
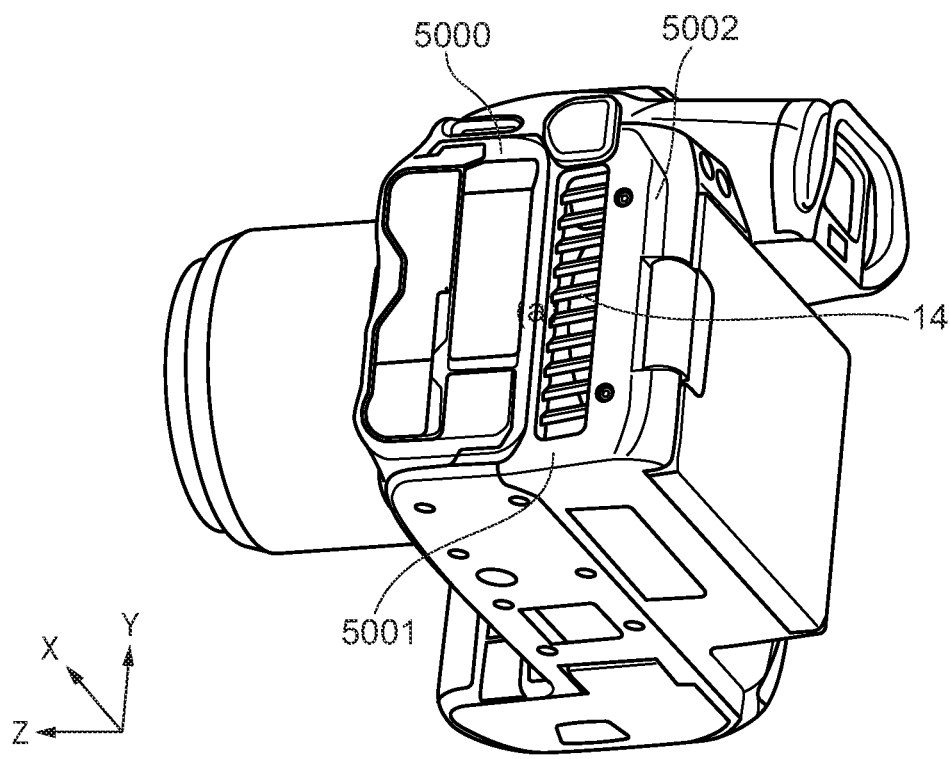
FIGS. 19A and 19B are a perspective view and a bottom view of the image capturing apparatus.
Figure 19B:
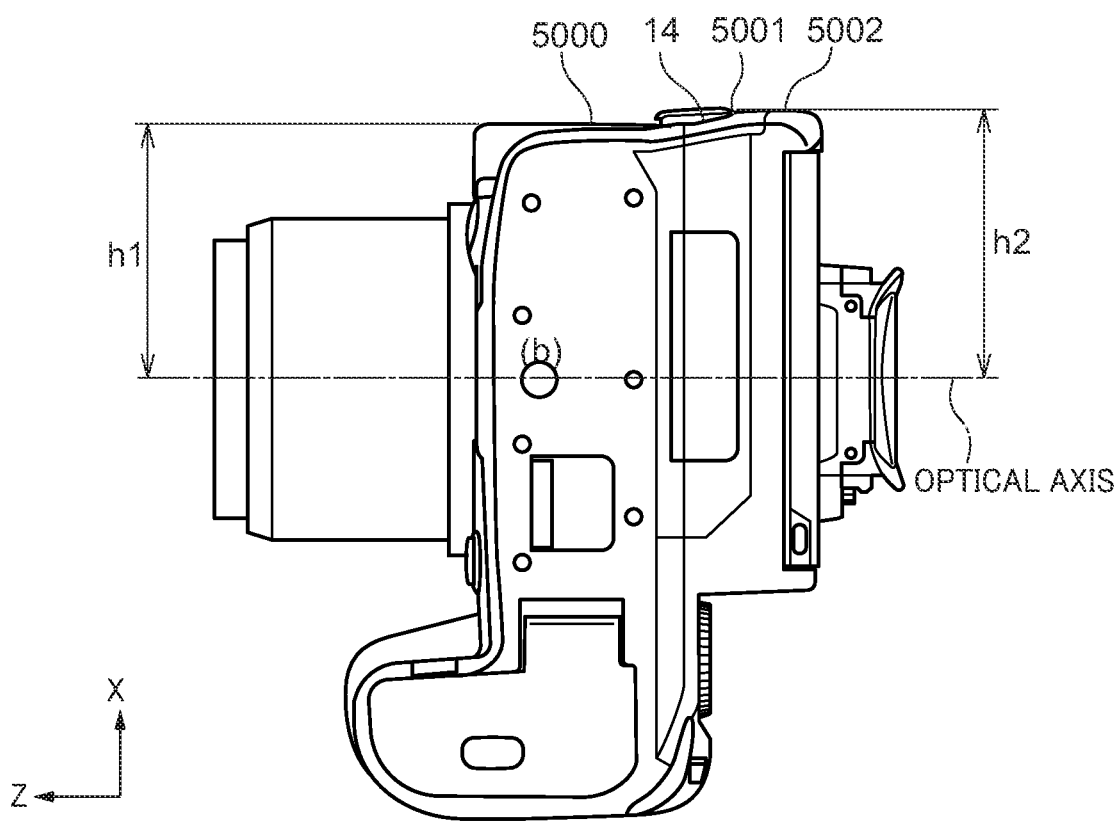
Figure 20:
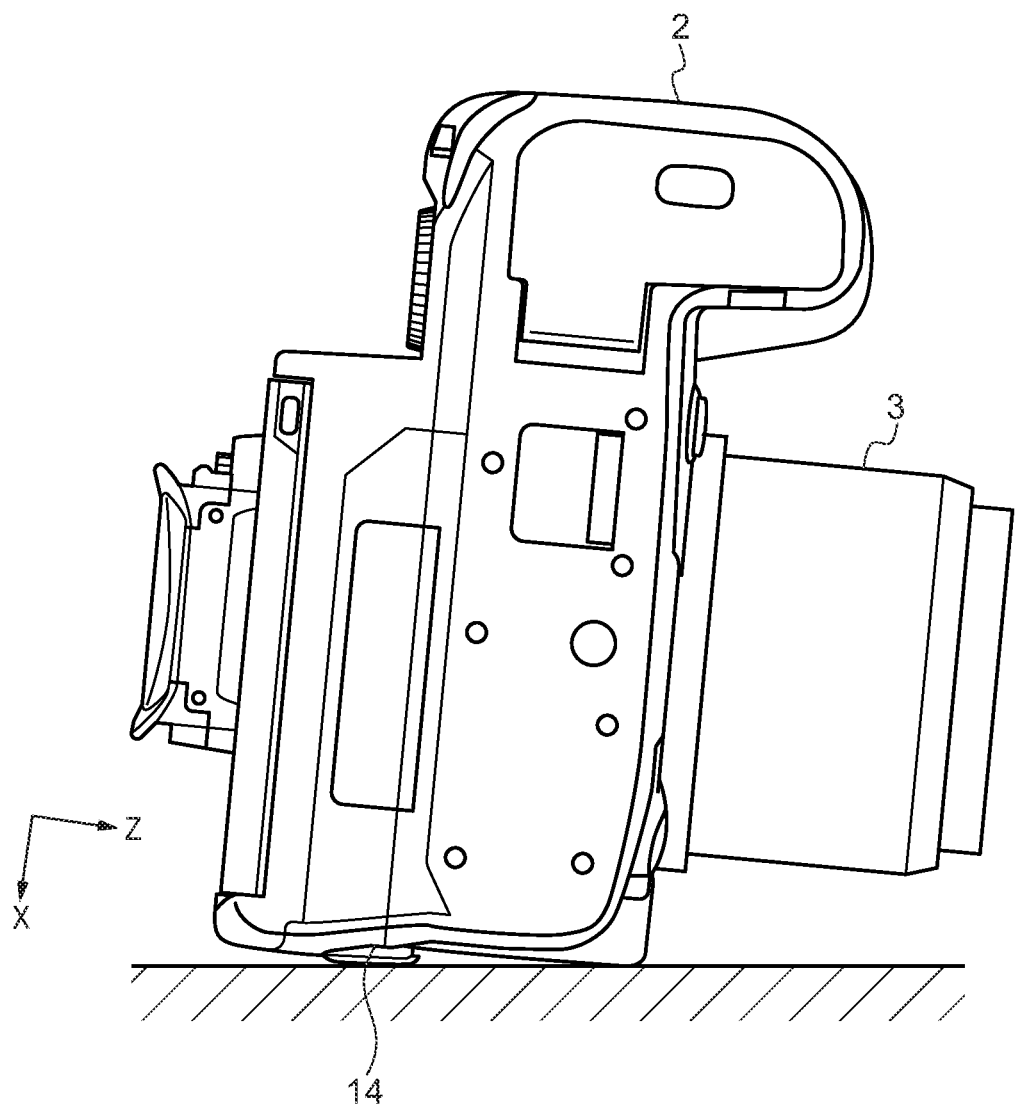
FIG. 20 is a bottom view of the image capturing apparatus in a state in which the image capturing apparatus is placed on a placing surface such that a right-side surface of the image capturing apparatus is brought into contact with the placing surface.

Next, the air outlet port 14 and the peripheral components will be described. FIG. 19A is a perspective view of the image capturing apparatus 1, in which the components on the right-side surface and the bottom surface (lower surface) are mainly shown. FIG. 19B is a bottom view of the image capturing apparatus 1. FIG. 20 is a bottom view showing a state in which the image capturing apparatus 1 is placed on a placing surface, such as the top surface of a table, such that the right-side surface of the image capturing apparatus 1 is brought into contact with the placing surface.

The right-side cover of the image capturing apparatus body 2 has a first side surface 5000, a second side surface 5001, and a third side surface 5002. The first side surface 5000 is substantially perpendicular to the X-axis, the second side surface 5001 is continuous with the first side surface 5000 and has an inclined portion which forms a predetermined angle with a surface perpendicular to the X-axis. The third side surface 5002 is continuous with the second side surface 5001 and is substantially parallel to the first side surface 5000.

In the X direction, a distance h1 from the optical axis to the first side surface 5000 is different from a distance h2 from the optical axis to the third side surface 5002 (h1≠h2), and a relationship expressed by h1<h2 holds in the image capturing apparatus body 2. The air outlet port 14 for discharging heat generated in the image capturing apparatus body 2 to the outside is formed in the second side surface 5001. Therefore, as shown in FIG. 20, even in a state in which the image capturing apparatus 1 is placed such that the right-side surface of the image capturing apparatus 1 is brought into contact with the placing surface, the air outlet port 14 is prevented from being covered by the placing surface. Therefore, it is possible to positively dissipate heat generated in the image capturing apparatus 1 to the outside.

Figure 21:
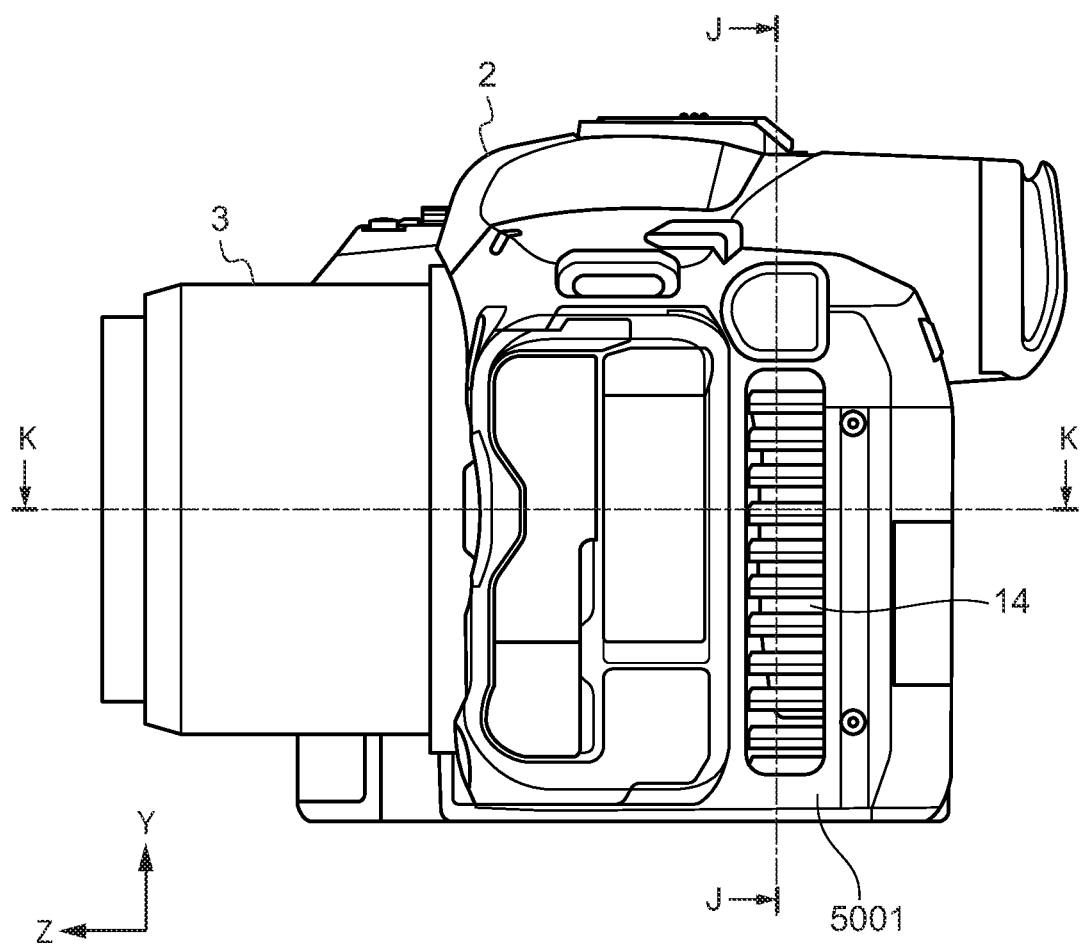
FIG. 21 is a side view of the image capturing apparatus.
Figure 22A:
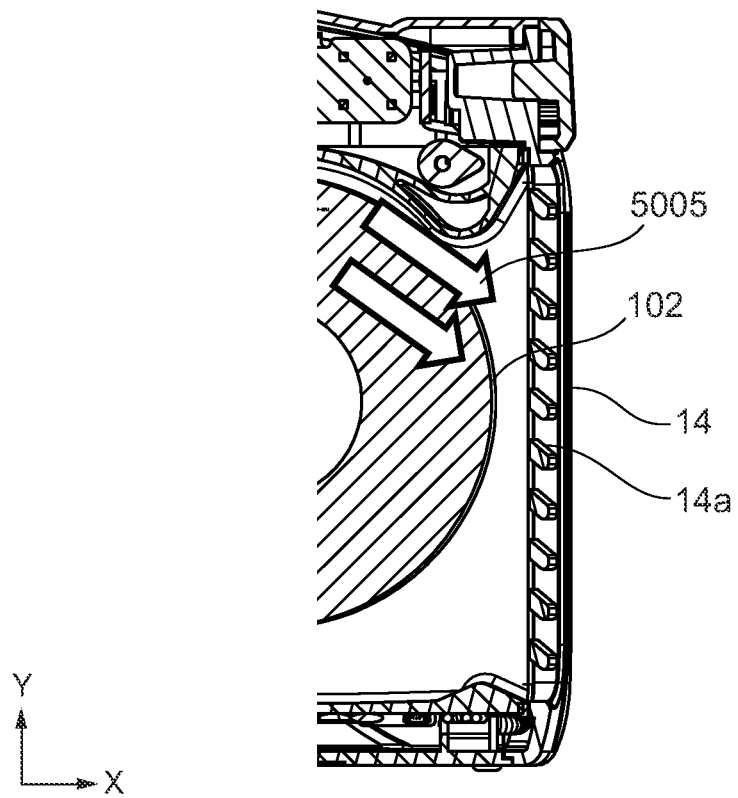
FIGS. 22A and 22B are cross-sectional views taken along J-J and K-K in FIG. 21, respectively.
Figure 22B:
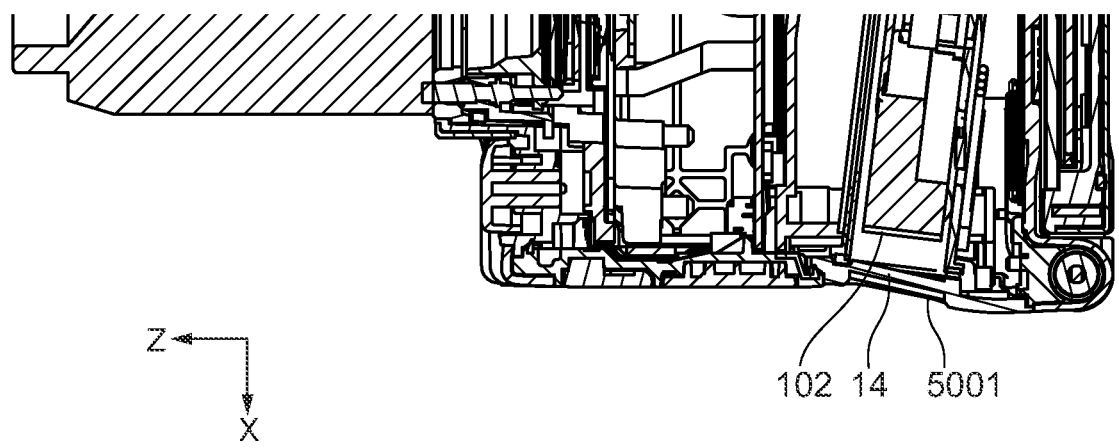

FIG. 21 is a side view of the image capturing apparatus 1. FIG. 22A is a cross-sectional view taken along J-J in FIG. 21, and FIG. 22B is a cross-sectional view taken along K-K in FIG. 21. As shown in FIG. 22B, the cooling fan 102 is dispose close to the air outlet port 14, which makes it possible to efficiently dissipate heat generated in the image capturing apparatus 1 to the outside using the cooling fan 102.

Further, as shown in FIGS. 21 and 22A, the air outlet port 14 has a plurality of air outlet port louver portions 14a each having a slat shape. Each outlet port louver portion 14a is inclined obliquely downward from the inside of the image capturing apparatus 1 toward the outside, which makes it difficult to see the inside of the air outlet port 14. That is, the cooling fan 102 disposed near the air outlet port 14 is hardly seen from the outside, and hence it is possible to prevent degradation of the appearance quality or improve the appearance quality.

Further, as shown in FIG. 22B, the second side surface 5001 in which the air outlet port 14 is formed is inclined with respect to a plane perpendicular to the X-axis. This makes it difficult to see the inside of the air outlet port 14 when viewing the air outlet port 14 from the right side (+X side) of the image capturing apparatus 1, which also makes it possible to prevent degradation of the appearance quality or improve the appearance quality. Further, as shown in FIG. 22A, an air exhaust direction 5005 of the cooling fan 102 is substantially parallel to the inclination of the air outlet port louver portions 14a. This makes it possible to smoothly discharge (reduce pressure loss) air flowing in the duct unit 120 from the air outlet port 14, whereby it is possible to efficiently dissipate heat from the inside of the image capturing apparatus 1 to the outside air. Note that the structure of the opening of the air outlet port 14 is not limited to the opening for discharging air but can be applied to an opening for sucking air.

Figure 23A:
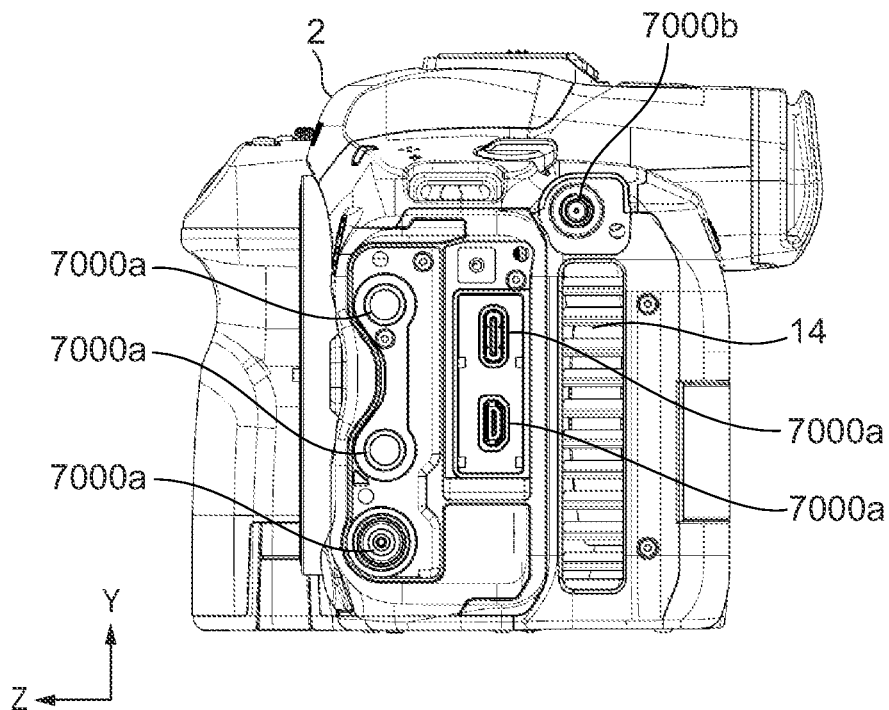
FIGS. 23A and 23B are side views of the image capturing apparatus body.
Figure 23B:
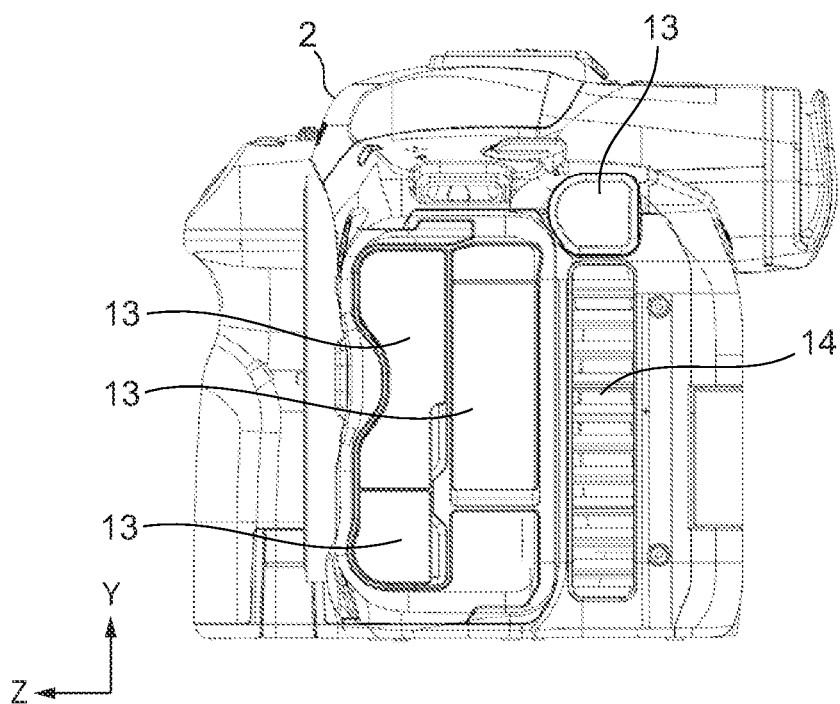

Next, the arrangement of the connection terminals in the image capturing apparatus 1 will be described. FIG. 23A is a side view of the image capturing apparatus body 2, showing a state in which the external terminal covers 13 for protecting the external connection terminal group 131 have been removed. FIG. 23B is a side view of the image capturing apparatus 1, showing a state in which the external terminal covers 13 have been attached.

The right-side surface of the image capturing apparatus body 2 is provided with the air outlet port 14. Further, in the vicinity of the air outlet port 14, connection terminals 7000a and 7000b are arranged as the external connection terminal group 131 which enables inputting and outputting of data, power supply, and so forth, to and from the image capturing apparatus 1, by connecting connector cables and the like.

On the right-side surface of the image capturing apparatus body 2, the five connection terminals 7000a are arranged on the front side (+Z side) of the air outlet port 14, and another connection terminal 7000b is arranged on the upper side (+Y side) of the air outlet port 14. When predetermined connector cables are inserted in the connection terminals 7000a and the connection terminal 7000b, respectively, a cable housing portion of each connector cable protrudes from the +X side of the image capturing apparatus body 2.

As a cover member for protecting the connection terminals 7000a and 7000b when the connection terminals 7000a and 7000b are not used, the external terminal covers 13 are provided. In a state covering the connection terminals 7000a and 7000b, the external terminal covers 13 are held in a form extending along the right-side surface of the image capturing apparatus body 2. When using a desired one of the connection terminals 7000a and 7000b, a user is required to open an associated one of the external terminal covers 13. The external terminal covers 13 are each arranged such that the user can move the external terminal cover 13 in a direction away from the image capturing apparatus body 2 by hooking e.g. a finger to its end portion and pushing up the end portion.

On the rear side of the image capturing apparatus body 2, the display panel 16 is arranged such that it is rotatable in an opening/closing direction and rotatable in a tilting/reversing direction, via a two-axes variable angle hinge mechanism. That is, the display panel 16 is rotatable about an axis parallel to the Y-axis (first rotational axis) in the opening/closing direction between a closed position where the display panel 16 is positioned on the rear side of the image capturing apparatus body 2 and an opened position where the display panel 16 protrudes from the +X side of the image capturing apparatus body 2. Further, the display panel 16 is rotatable about an axis perpendicular to the Y-axis (second rotational axis) in the tilting/reversing direction.

Figure 24:
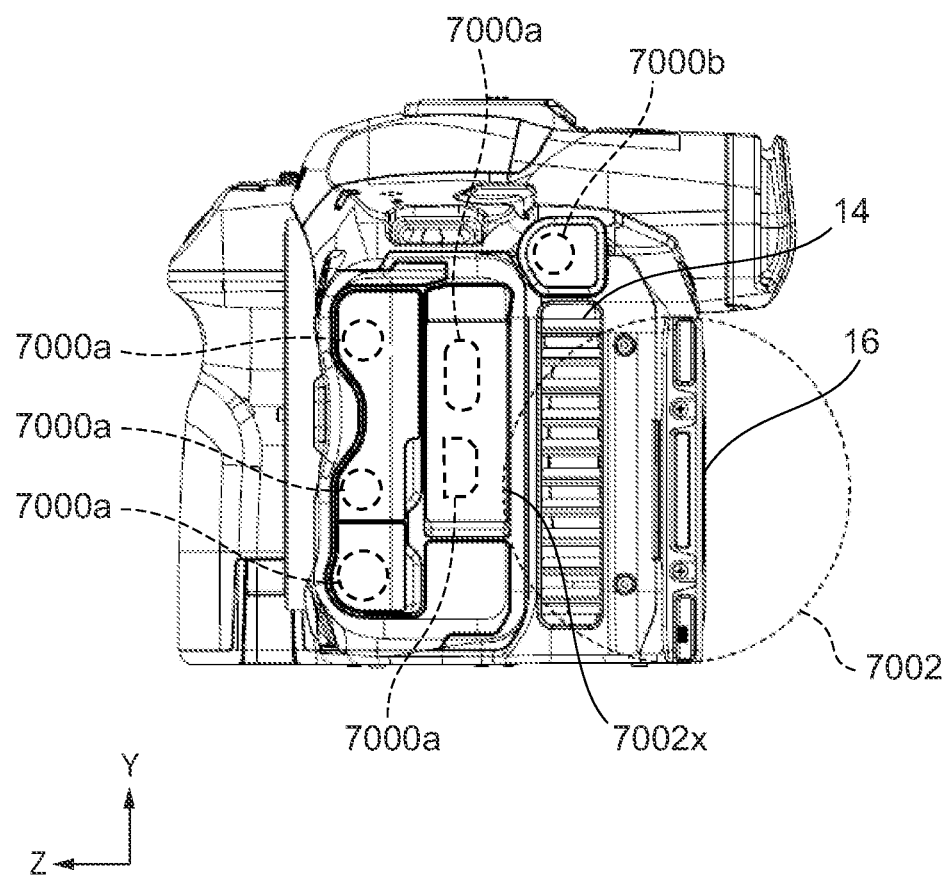
FIG. 24 is a right-side view of the image capturing apparatus body in a state in which a display panel is opened.

FIG. 24 is a right-side view of the image capturing apparatus body 2, showing a state in which the display panel 16 is opened through approximately 180° in the opening/closing direction (state in which the display panel 16 protrudes toward the near side of the drawing sheet (opened state)). When the display panel 16 is rotated in the tilting/reversing direction in the opened state, the display panel 16 is rotatable within a range of a rotation track 7002. Although the rotation track 7002 is close to the first side surface 5000 on which the connection terminals 7000a are arranged, the rotation track 7002 does not overlap the connection terminals 7000a and 7000b when viewed in the X-axis direction. Therefore, even in a state in which a cable is connected to any one of the connection terminals 7000a and 7000b, the cable does not interfere with rotation of the display panel 16 in the tilting/reversing direction.

Figure 25:
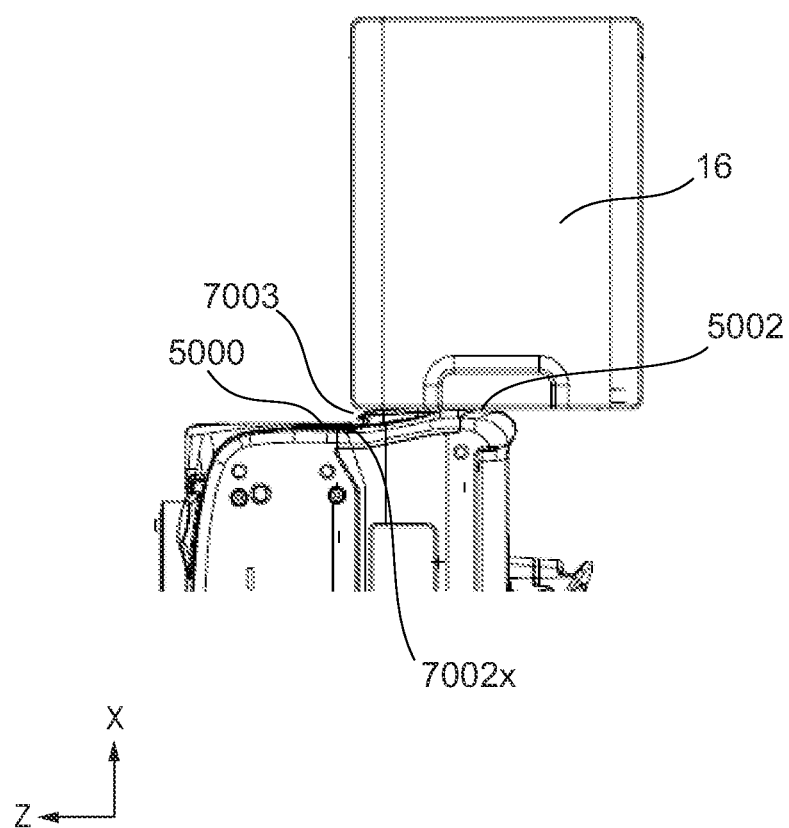
FIG. 25 is a view of the right-side surface and its vicinity, as viewed from a bottom side of the image capturing apparatus body.

On the other hand, one of the external terminal covers 13 and the rotation track 7002 have an overlapping portion 7002x where they partially overlap each other when viewed in the X-axis direction. The influence of the overlapping portion 7002x on the operability of the external terminal cover 13 will be described with reference to FIG. 25. FIG. 25 is a view of the right-side surface and its vicinity, as viewed from the bottom side of the image capturing apparatus body 2, showing a state in which the display panel 16 is opened through approximately 180° in the opening/closing direction and rotated through approximately 90° in the tilting/reversing direction. In this state, a display screen of the display panel 16 faces the +Y direction.

As described above, the side unit 800 is formed by the three surfaces (the first side surface 5000, the second side surface 5001, and the third side surface 5002). The external terminal covers 13 corresponding to the first side surface 5000 are at respective locations on the −X side with respect to the surface of the hinge of the display panel 16, which corresponds to the third side surface 5002, and hence a gap 7003 is formed between the display panel 16 and the external terminal covers 13. Therefore, even when the overlapping portion 7002x exists where the display panel 16 partially overlaps the external terminal cover 13 when viewed in the X-axis direction, the user can easily open the external terminal cover 13 by inserting a finger in the gap 7003 and pulling up the external terminal cover 13.

Figure 26:
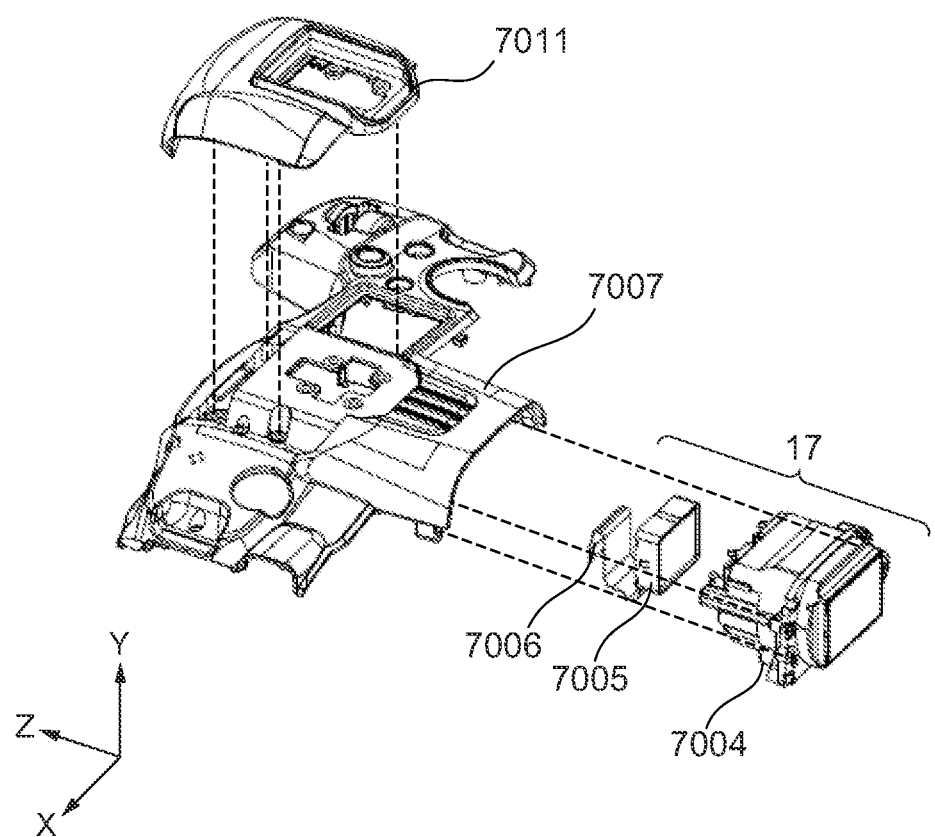
FIG. 26 is an exploded perspective view of a top unit.

Next, the heat dissipation structure of the electronic viewfinder 17 will be described. FIG. 26 is an exploded perspective view of the top unit 500. The electronic viewfinder 17 is formed by a finder panel 7005 for displaying an image and an optical component 7004 for enlarging an image on the finder panel 7005. The electronic viewfinder 17 is screwed and fixed to a finder cover 7007 for covering a top surface and side surfaces of the electronic viewfinder 17. A flexible board 7006 connected to the finder panel 7005 is connected to the main circuit board 101 (not shown in FIG. 26), whereby image signals are transmitted from the main circuit board 101 to the finder panel 7005. When the electronic viewfinder 17 is used, heat is generated in the finder panel 7005, and hence a heat dissipation structure for stably displaying an image on the finder panel 7005 is required.

Figure 27:
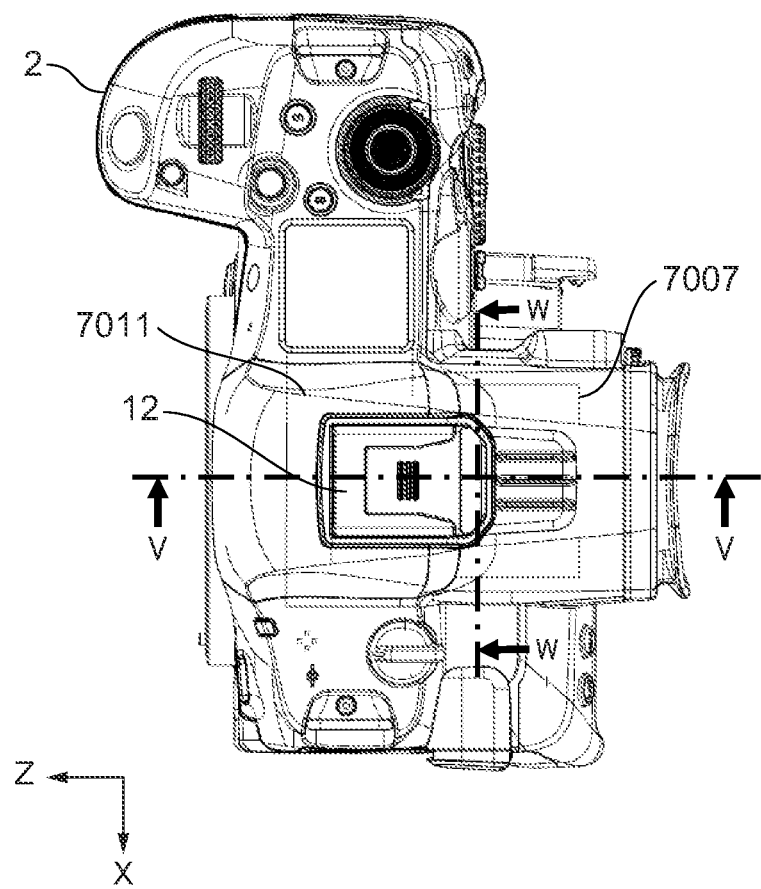
FIG. 27 is a top view of the image capturing apparatus.
Figure 28A:
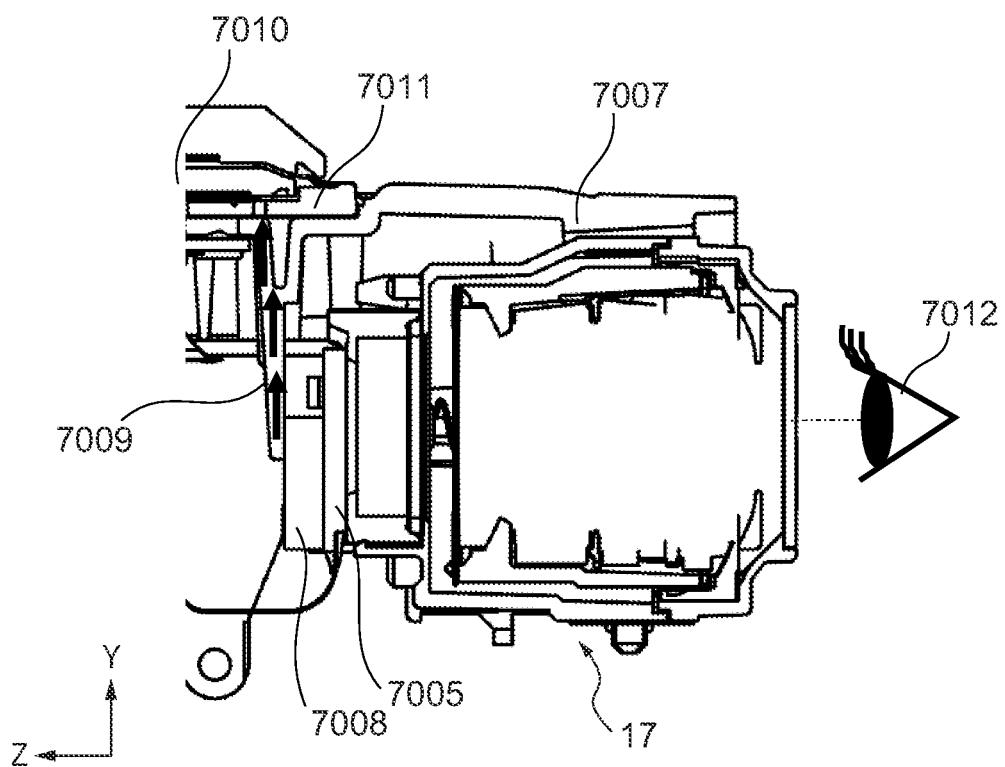
FIGS. 28A and 28B are cross-sectional views taken along V-V and W-W in FIG. 27, respectively.

FIG. 27 is a top view of the image capturing apparatus. FIG. 28A is a cross-sectional view taken along V-V in FIG. 27, and FIG. 28B is a cross-sectional view taken along W-W in FIG. 27.

The finder cover 7007 has a heat dissipation wall 7009. The heat dissipation wall 7009 is arranged to be substantially parallel to a rear surface (surface on the +Z side) of the finder panel 7005, i.e. substantially perpendicular to a top surface, in a state in which the finder cover 7007 has been attached. The finder cover 7007 is formed of metal, such as magnesium, which is high in heat conductivity, light, and high in rigidity. Further, on the rear surface (surface on the −Z side) of the finder panel 7005, a heat dissipation rubber 7008 is affixed. A surface of the heat dissipation rubber 7008, opposite from a surface which is in contact with the rear surface of the finder panel 7005, is in contact with the heat dissipation wall 7009. That is, the heat dissipation rubber 7008 is sandwiched and held between the heat dissipation wall 7009 and the finder panel 7005.

Further, the accessory shoe 12 is disposed in the central portion of the finder cover 7007. The periphery of the accessory shoe 12 is covered with a shoe cover 7011 different from the finder cover 7007. The shoe cover 7011 is formed of a material which is low in heat conductivity, such as resin.

Figure 28B:
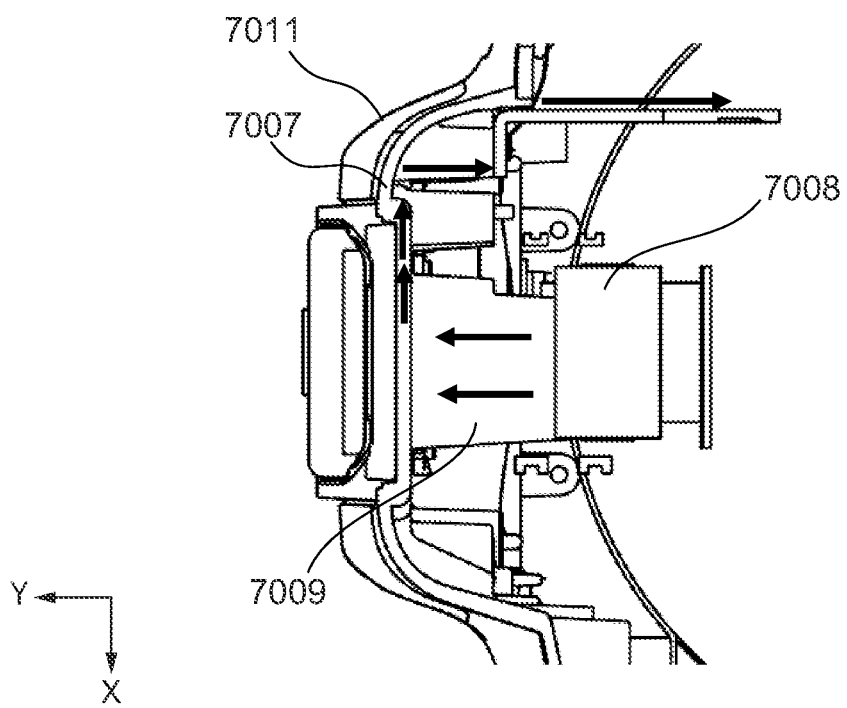

As shown in FIG. 28B, the shoe cover 7011 covers the root part (part on the +Y side) of the heat dissipation wall 7009. Heat generated in the finder panel 7005 is transferred from the lower part (part on the −Y side) of the heat dissipation wall 7009 to the root part along arrows indicated on the heat dissipation wall 7009 in FIG. 28A. The heat transferred to the root part of the heat dissipation wall 7009 is transferred to the inside of the body along arrows indicated on the heat dissipation wall 7009 in FIG. 28B and then discharged to the outside via the duct base 104 and the like.

As described above, by using the finder cover 7007 formed of metal having high heat conductivity as the heat-conductive member for transferring heat generated in the finder panel 7005, the number of components is reduced, which makes it possible to realize cost reduction. Further, since the periphery of the root part of the finder cover 7007 is covered with the shoe cover 7011 made of resin having low heat conductivity, a user is prevented from directly touching the heat dissipation path, and the safety is ensured. Further, when a user uses the electronic viewfinder 17, a user's eye 7012 looking into the electronic viewfinder 17 is at a location indicated in FIG. 28A. The user's eye 7012 is positioned at a location opposite from the heat dissipation wall 7009 across the electronic viewfinder 17 in the Z direction, and hence the user's eye 7012 is prevented from receiving thermal stimulation.

As described above, in the image capturing apparatus 1 according to the present embodiment, it is possible to efficiently dissipate heat generated in the image capturing apparatus body 2 to the outside, and what is more, it is possible to realize size reduction of the image capturing apparatus body 2.

While the disclosure has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of priority from Japanese Patent Application No. 2021-190114 filed Nov. 24, 2021, which is hereby incorporated by reference herein in its entirety.

What is claimed is:

1. An image capturing apparatus including:
an imaging board that has an image sensor mounted thereon,
a main circuit board that has heat generating devices mounted thereon and is disposed substantially in parallel to an imaging surface of the image sensor, on a rear side of the imaging board,
a duct unit that is disposed on a rear side of the main circuit board, and
a cooling fan that draws outside air into the duct unit, and
a rear cover that is disposed on a rear side of the cooling fan,
wherein the duct unit comprises:
a duct base that is opposed to the main circuit board and is disposed substantially in parallel to the main circuit board; and a duct plate that is disposed obliquely to the duct base at a predetermined angle,
wherein the cooling fan is mounted on the duct plate,
wherein the rear cover that is disposed substantially in parallel to the duct base, and
wherein a space portion having a substantially triangular cross-sectional shape, as viewed from above the image capturing apparatus, is formed between the cooling fan and the rear cover.

2. The image capturing apparatus according to claim 1, further including a display device that is disposed on a rear side of the image capturing apparatus,
wherein the rear cover is an electrical connection portion connected to the display device, and
wherein the electrical connection portion is disposed in the space portion.

3. The image capturing apparatus according to claim 1, the duct unit includes a plurality of duct fins extending along a flowing direction of air flowing in the duct unit, and
wherein the duct fins are arranged at a location where the duct fins do not overlap the cooling fan when viewed from above the image capturing apparatus, and overlap the cooling fan when viewed in a width direction of the image capturing apparatus.

4. An image capturing apparatus including:
a main circuit board that has heat generating devices mounted thereon and is disposed to be substantially perpendicular to an optical axis direction,
a power supply board that has a component mounted thereon for controlling power supply, and is disposed substantially in parallel to the main circuit board, on a rear side of the main circuit board,
a duct unit that is disposed on a rear side of the power supply board, and
a cooling fan that draws outside air into the duct unit,
wherein the image capturing apparatus comprises:
an elastic member that has a heat insulation property and is disposed between the main circuit board and the power supply board;
a first heat-conductive member that is disposed between the elastic member and the main circuit board; and
a second heat-conductive member that is disposed between the power supply board and the duct unit,
wherein part of the first heat-conductive member is routed between the second heat-conductive member and the duct unit and is brought into contact with the second heat-conductive member and the duct unit.

5. The image capturing apparatus according to claim 4, wherein the part of the first heat-conductive member is routed from outside of two opposite sides of the power supply board.

6. The image capturing apparatus according to claim 5, wherein the part of the first heat-conductive member is brought into contact with the second heat-conductive member and the duct unit without overlapping in the optical axis direction between the second heat-conductive member and the duct unit.

7. The image capturing apparatus according to claim 4, wherein the first heat-conductive member is brought into contact with the heat generating devices mounted on the main circuit board.

8. The image capturing apparatus according to claim 4, wherein an amount of heat generated in the main circuit board is larger than an amount of heat generated in the power supply board.

9. An image capturing apparatus including:
an accommodating section that accommodates a recording medium,
a duct unit,
a cooling fan that causes air to flow in the duct unit,
an operation member that is arranged on a rear surface of the holding part,
a plate that is made of metal and supports the operation member
a first heat-conductive member that thermally connects between part of the accommodating section and an inner wall, along which air flows, of the duct unit, and
a second heat-conductive member that has elasticity and is mounted on the plate,
wherein the accommodating section is provided in a holding part for holding the image capturing apparatus by a hand, and
wherein the first heat-conductive member is thermally connected to the plate via the second heat-conductive member in an intermediate portion of a path connecting between a surface of the accommodating section and an inner surface of the duct unit.

10. The image capturing apparatus according to claim 9, wherein the duct unit has an opening in which the first heat-conductive member is inserted, and
wherein the image capturing apparatus further comprises an elastic member that is arranged on the opening, and is compressed to thereby close the opening and press the first heat-conductive member toward the duct unit.

11. An image capturing apparatus including:
a duct unit;
a cooling fan that causes air to flow through the duct unit,
an air inlet port that draws air into the duct unit, and
an air outlet port that discharges air inside the duct unit to outside of the image capturing apparatus,
wherein at least one of the air inlet port and the air outlet port is formed in a first surface and a second surface in a state extending thereacross, which are not parallel to each other, and
wherein the duct unit comprises:
a first space extending from the first surface in a direction perpendicular to the first surface;
a second space extending from the second surface in a direction perpendicular to the second surface; and
a louver that is provided on an opening surface of the air inlet port or the air outlet port,
wherein the first space and the second space do not overlap each other when viewed from above the image capturing apparatus, and
wherein the louver extends in a direction perpendicular to the opening surface.

12. The image capturing apparatus according to claim 11, further including:
a holding part for holding the image capturing apparatus by a hand, and
an operation dial that is disposed on a rear surface of the holding part, and
wherein a rotational axis of the operation dial is substantially parallel to the first surface and is positioned at a location closer to the second surface than the first surface.

13. An image capturing apparatus including:
a duct unit; and
a cooling fan that causes air to flow in the duct unit,
wherein one of side surfaces of the image capturing apparatus in a width direction, comprises:

a first side surface:

a second side surface that forms a predetermined angle with the first side surface and is continuous with the first side surface; and a third side surface that forms a predetermined angle with the second side surface and is continuous with the second side surface, the third side surface being substantially parallel to the first side surface, wherein the image capturing apparatus includes:

a display panel that is disposed to be rotatable about a first rotational axis between a closed position on a rear side of the image capturing apparatus and an opened position where the display panel protrudes from the one of side surfaces, and be rotatable about a second rotational axis perpendicular to the first rotational axis, and a cover member that covers terminals provided on the image capturing apparatus, on the first side surface, wherein an opening for drawing air into the duct unit or discharging air from the duct unit is provided in the second side surface, and wherein when the display panel is rotated about the second rotational axis in a state in which the display panel is in the opened position, a track of rotation of the display panel and part of the cover member overlap each other when viewed in the width direction, and a gap is formed between the display panel and the cover member in the width direction.

14. The image capturing apparatus according to claim 13, wherein the cooling fan is disposed close to the opening.

15. The image capturing apparatus according to claim 13, wherein a distance from an optical axis of the image capturing apparatus to the first side surface is shorter than a distance from the optical axis to the third side surface.

16. An image capturing apparatus including:

an electronic viewfinder, and a finder panel that displays an image on the electronic viewfinder, wherein the image capturing apparatus comprises:

a finder cover that has a heat dissipation wall arranged substantially in parallel to the finder panel and covers a top surface and side surfaces of the electronic viewfinder; and a heat-conductive member that is sandwiched and held between the finder panel and the heat dissipation wall.

17. The image capturing apparatus according to claim 16, further including:

an accessory shoe that is disposed in the finder cover, and a shoe cover that is formed of a material having low heat conductivity and covers a periphery of the accessory shoe, and wherein the shoe cover covers a root and a portion of the finder cover.

18. The image capturing apparatus according to claim 16, further including:

a duct unit; and a cooling fan that causes air to flow in the duct unit, and wherein the finder cover is thermally connected to the duct unit.

* * * * *